(12) United States Patent
Stridsman

(10) Patent No.: US 11,582,281 B2
(45) Date of Patent: *Feb. 14, 2023

(54) LOCATION-BASED TAGGING AND RETRIEVING OF MEDIA CONTENT

(71) Applicant: Spotify AB, Stockholm (SE)

(72) Inventor: Fredrik Stridsman, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,437

(22) Filed: Jan. 30, 2020

(65) Prior Publication Data
US 2020/0244717 A1     Jul. 30, 2020

Related U.S. Application Data

(63) Continuation of application No. 14/883,236, filed on Oct. 14, 2015, now Pat. No. 10,587,667.
(Continued)

(51) Int. Cl.
*H04L 65/65* (2022.01)
*H04L 67/1021* (2022.01)
(Continued)

(52) U.S. Cl.
CPC .......... *H04L 65/65* (2022.05); *H04L 67/1021* (2013.01); *H04N 21/2585* (2013.01);
(Continued)

(58) Field of Classification Search
CPC ............. H04L 65/608; H04L 67/2021; H04N 21/25841; H04N 21/2585; H04N 21/26258; H04N 21/4825
See application file for complete search history.

(56) References Cited

U.S. PATENT DOCUMENTS 6,657,116 B1 * 12/2003 Gunnerson .......... G10H 1/0041
434/307 A
6,807,450 B1 * 10/2004 Takenaka ......... G11B 20/00007
369/47.13
(Continued)

OTHER PUBLICATIONS

International Search Report and Written Opinion from corresponding International Patent Application No. PCT/IB2015/002612, dated May 4, 2016, 9 pages.
(Continued)

*Primary Examiner* — Jason D Recek
(74) *Attorney, Agent, or Firm* — Merchant & Gould P.C.

(57) ABSTRACT

Systems, apparatuses, components, methods, and techniques for location-based tagging and retrieving of media content are provided. Some embodiments include a media-playback device. The media-playback device includes a location-determining device that determines a geographical location of the media-playback device, a media-output device that plays media content items, at least one computer readable data storage device. The media-playback device operates to receive a selection of a location-based media playlist, the location-based media playlist including playlist data that identifies a set of media content items and defines a route. A geographic location of the media-playback device is determined using the location-determining device. A media content item of the location-based playlist is identified based on the determined geographic location and the route. The media-playback device plays the media content item.

22 Claims, 19 Drawing Sheets

Related U.S. Application Data

(60) Provisional application No. 62/098,160, filed on Dec. 30, 2014.

(51) Int. Cl.
  *H04N 21/258* (2011.01)
  *H04N 21/262* (2011.01)
  *H04N 21/482* (2011.01)

(52) U.S. Cl.
  CPC . *H04N 21/25841* (2013.01); *H04N 21/26258* (2013.01); *H04N 21/4825* (2013.01)

(56) References Cited

U.S. PATENT DOCUMENTS

| | | | |
|---|---|---|---|
| 9,431,980 B2* | 8/2016 | Popova | H03G 3/20 |
| 10,587,667 B2 | 3/2020 | Stridsman | |
| 2003/0183064 A1* | 10/2003 | Eugene | G10H 1/0033 |
| | | | 84/609 |
| 2006/0136173 A1* | 6/2006 | Case | A63B 24/0062 |
| | | | 702/182 |
| 2009/0094257 A1 | 4/2009 | Nissen | |
| 2010/0077017 A1* | 3/2010 | Martinez | H04W 4/02 |
| | | | 709/201 |
| 2010/0088023 A1* | 4/2010 | Werner | G01C 21/20 |
| | | | 701/467 |
| 2011/0066438 A1* | 3/2011 | Lindahl | G10L 13/033 |
| | | | 704/258 |
| 2011/0258267 A1* | 10/2011 | Tozaki | G01C 21/3697 |
| | | | 709/206 |
| 2012/0109345 A1* | 5/2012 | Gilliland | G11B 27/105 |
| | | | 700/94 |
| 2012/0221687 A1* | 8/2012 | Hunter | G06F 16/435 |
| | | | 709/219 |
| 2013/0060908 A1* | 3/2013 | Whitmyer, Jr. .. | H04N 21/25841 |
| | | | 709/219 |
| 2013/0198633 A1 | 8/2013 | Hyman | |
| 2013/0205223 A1* | 8/2013 | Gilbert | H04L 67/02 |
| | | | 715/748 |
| 2014/0115463 A1 | 4/2014 | Reznor et al. | |
| 2014/0258553 A1* | 9/2014 | Skeen | G06F 16/639 |
| | | | 709/231 |
| 2014/0281971 A1* | 9/2014 | Isbell, III | H04N 21/42202 |
| | | | 715/716 |

OTHER PUBLICATIONS

Communication from EP Application No. 15848121.8 dated May 31, 2019(10 pages).
Communication from EP Application No. 15848121.8 dated May 24, 2018 (2 pages).
EP Search Report from EP Application No. 19186759.7 dated Sep. 4, 2019 (3 pages).
PCT International Search Report and Written Opinion from International Patent Application No. PCT/IB2015/002612, dated Feb. 27, 2017, 6 pages.

* cited by examiner

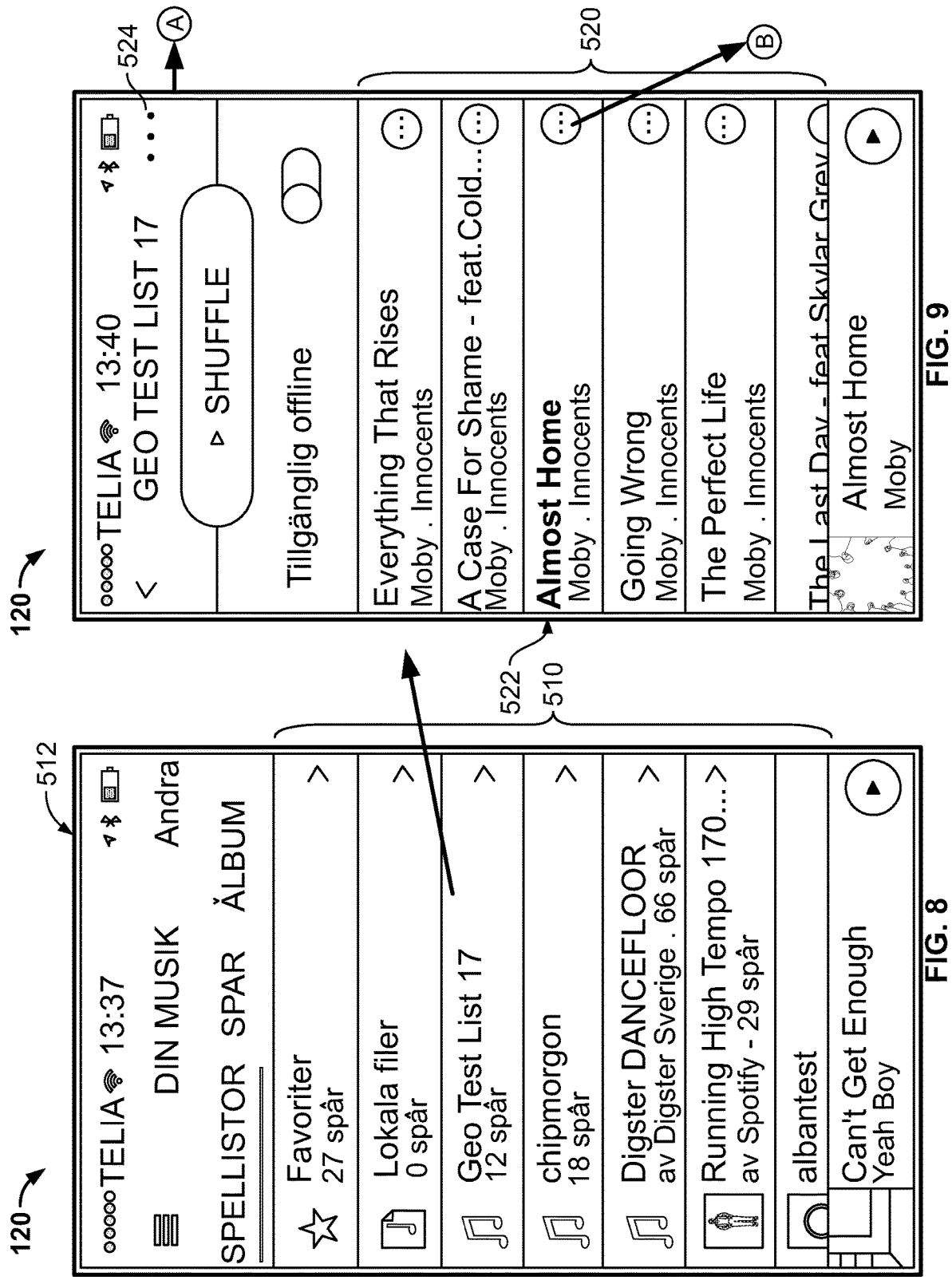

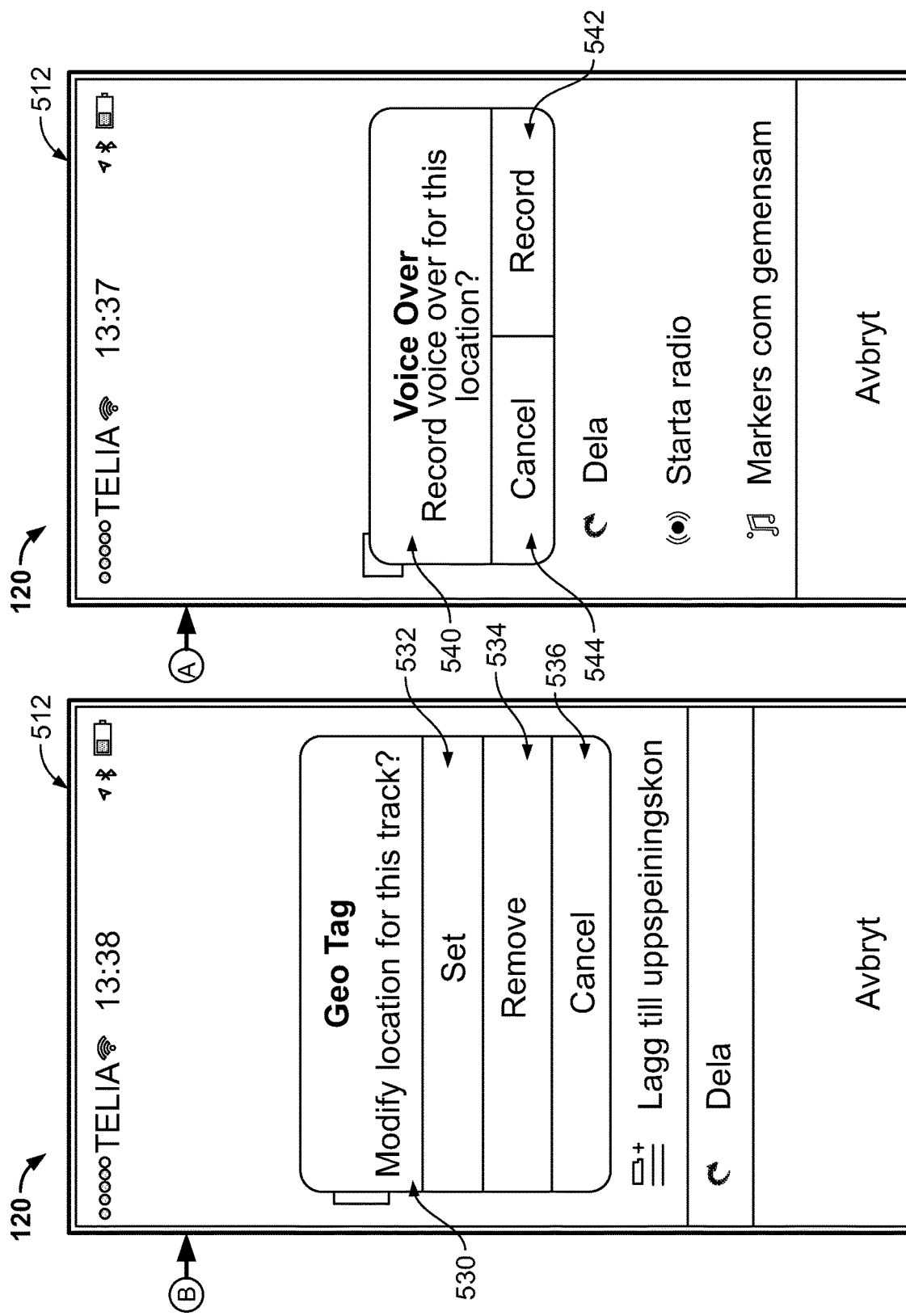

LOCATION-BASED TAGGING AND RETRIEVING OF MEDIA CONTENT

CROSS-REFERENCE TO RELATED APPLICATION

This application is a Continuation of U.S. application Ser. No. 14/883,236, filed on Oct. 14, 2015, which claims priority to U.S. Application No. 62/098,160, filed on Dec. 30, 2014 entitled LOCATION-BASED TAGGING AND RETRIEVING OF MEDIA CONTENT, the disclosures of which are hereby incorporated by reference in their entireties. To the extent appropriate a claim of priority is made to each of the above-disclosed applications.

BACKGROUND

Consuming media content, such as listening to audio content or watching video content, is a common and enjoyable activity for many consumers. Using a mobile device, such as a phone or a tablet, a consumer can access large catalogs of media content from almost any location. For example, a consumer can store a large catalog of media content on his or her mobile device. Additionally, a consumer can access an almost limitless catalog of media content through various free and subscription-based streaming services.

This nearly limitless access to media content introduces new challenges for consumers. It may be difficult to find or select the right media content for a particular moment in time.

SUMMARY

In general terms, this disclosure is directed to location-based tagging and retrieving of media content. In one possible configuration and by non-limiting example, a location-based media playlist includes multiple media content items that form a route. Various aspects are described in this disclosure, which include, but are not limited to, the following aspects.

One aspect is a media-playback device comprising: a location-determining device that determines a geographical location of the media-playback device; a media-output device that plays media content items; at least one computer readable data storage device storing instructions that, when executed by the at least one processing device, cause the media-playback device to: receive a selection of a location-based media playlist, wherein the location-based media playlist comprises playlist data that identify a set of media content items and define a route; determine a geographic location of the media-playback device using the location-determining device; identify a media content item of the location-based playlist based on the determined geographic location and the route; and play the media content item.

In at least some example media-playback devices, the playlist data defining a route comprise at least one route-based rule. Further, in some examples, the route-based rule is based at least in part on at least one of: a movement direction, a velocity, an order, and an activity type. Additionally, in some examples, identifying a media content item further comprises determining that the media content item is associated with the geographic location and that the at least one route-based rule is satisfied.

In at least some example media-playback devices, the media content item is a voice-over audio file. Further, in some examples, the voice-over audio file is a user generated audio file recorded using the media-playback device.

At least some example media-playback devices further comprise a network communication device that communicates with a media server, wherein playing the media content item comprises streaming the media content item from the media server using the network communication device. In some examples, the instructions further cause the media-playback device to receive the media playlist from the media server using the network communication device.

In at least some example media-playback devices, the instructions further cause the media-playback device to: receive a tag input; in response to receiving the tag input, determine a geographic location of the media-playback device using the location-determining device; and transmit a location tag to a media server, wherein the location tag includes the geographic location of the media-playback device and is usable by the media server to associate a media content item with the geographic location.

In at least some example media-playback devices, the instructions further cause the media-playback device to: receive a first tag input; in response to receiving the first tag input, determine a first geographic location of the media-playback device using the location-determining device; transmit a first location tag to a media server, wherein the first location tag includes the first geographic location and is usable by the media server to associate a media content item with the first geographic location; receive a second tag input; in response to receiving the second tag input, determine a second geographic location of the media-playback device using the location-determining device; transmit a second location tag to the media server, wherein the second location tag includes the second geographic location and is usable by the media server to associate a media content item with the second geographic location; and define the route, wherein the route includes the first and the second geographic locations.

In at least some example media-playback devices, the set of media content items comprise at least one voice-over audio file and at least one music audio file. Further, in some examples, the media content item is the voice-over audio file and wherein playing the media content item comprises playing the voice-over audio file while at least one music audio file is playing. In some examples, a volume at which the at least one music audio file is played is decreased while the voice-over audio file is played.

In at least some example media-playback devices, the instructions further cause the media-playback device to: receive a voice-over tag input; in response to receiving the voice-over tag input: determine a geographic location of the media-playback device using the location-determining device; and record an audio file using the audio recording device; and transmit a location tag and the audio file to a media server, wherein the location tag includes the geographic location and is usable by the media server to associate the audio file with the geographic location.

In at least some example media-playback devices, the playlist data further comprise at least one offset value associated with at least one of the media content items of the set, wherein the offset value specifies a temporal offset for playback of the media content item. Further, in some examples, playing the media content item comprises playing the media content item starting at a point into the media content item equal to the offset value.

In at least some example media-playback devices, the playlist data defining a route include trajectory data. Further, in some examples, the trajectory data include at least one of a velocity value, and a direction of travel value. Additionally, in some examples, the instructions further cause the media-playback device to: determine trajectory information for the media-playback device based on location data from the location-determining device; and wherein the media content item in the location-based playlist is identified based on the determined geographic location and the determined trajectory information. Yet further, in some examples, determining the trajectory information comprises determining using the location-determining device a second location of the media-playback device and calculating a change in the location of the media-playback device.

In at least some example media-playback devices, the instructions further cause the media-playback device to: play a current media content item from the location-based playlist; determine a geographic location of the media-playback device using the location-determining device; determine a distance from the determined geographic location and a geographic location associated with a destination media content item in the location-based playlist; and adjust the playback of the current media content item based on the distance. In some examples, the playback of the current media content item is adjusted by changing the tempo of the current media content item. Additionally, in some examples, the destination media content item is a media content item in the location-based playlist associated with a geographic location that the mobile device has not yet visited. Yet further, in some examples, the instructions further cause the media-playback device to determine trajectory data for the media-playback device and wherein the playback of the current media content item is adjusted based on the distance and the trajectory data.

Another aspect is a media server comprising: a media data store encoded on at least one computer readable data storage device, the data store comprising: a plurality of media content items; location data identifying geographical locations; and at least one location-based playlist comprising playlist data, wherein the playlist data identifies a subset of the media content items of the plurality of media content items and defines a route; and a computing device in data communication with the media data store, wherein the computing device is programmed to transmit a location-based playlist to a media-playback device.

In at least some example media servers, the playlist data associates at least one media content item from the subset of media content items with a geographical location and includes at least one route-based rule. Additionally, in some examples, the route-based rule is based at least in part on at least one of: a movement direction, a velocity, an order, and an activity type.

Further, in at least some example media servers, the computing device in data communication with the media data store is further programmed to: receive a location tag; and in response to receiving the location tag, associate a media content item identified by the location-based playlist with a geographic location. In some examples, the media content items comprise at least one voice-over audio file and at least one music audio file.

Additionally, in at least some example media servers, the computing device in data communication with the media data store is further programmed to: receive a voice-over tag and a voice-over audio file; in response to receiving the voice-over tag and voice-over audio file, store the voice-over audio file in the data store and associate the voice-over audio file with a geographic location. Further, in some examples, the playlist data further comprise at least one offset value associated with at least one of the media content items of the set, wherein the offset value specifies a temporal offset for playback of the media content item.

In at least some example media servers, the playlist data defining a route include trajectory data. Further, in some examples, the trajectory data include at least one of a velocity value, and a direction of travel value.

Yet another aspect is a method of media item playback on a media-playback device, the method comprising: displaying at least one location-based media playlist on a media-playback device, the media-playback device comprising: a processing device; a display device; a location-determining device; and a content output device; receiving by the media-playback device a selection of the location-based media playlist, wherein the location-based media playlist comprises playlist data that identifies a set of media content items and defines a route; determining a geographic location of the media-playback device using the location-determining device; identifying a media content item of the location-based playlist based on the determined geographic location and the route; and playing the media content item using the content output device.

In at least some example methods, the playlist data defining a route comprise at least one route-based rule. Further, in some examples, the route-based rule is based at least in part on at least one of: a movement direction, a velocity, an order, and an activity type. Additionally, in some examples, identifying a media content item further comprises determining that the media content item is associated with the geographic location and that the at least one route-based rule is satisfied.

Further, in at least some example methods, the media content item is a voice-over audio file. In some examples, the voice-over audio file is a user generated audio file recorded using the media-playback device.

Additionally, in at least some example methods, playing the media content item comprises streaming the media content item from a media server using a network communication device. Further, some example methods comprise receiving the media playlist from the media server using the network communication device. Additionally, some example methods comprise receiving a tag input; in response to receiving the tag input, determining a geographic location of the media-playback device using the location-determining device; and transmitting a location tag to a media server, wherein the location tag includes the geographic location of the media-playback device and is usable by the media server to associate a media content item with the geographic location.

At least some example methods further comprise receiving a first tag input; in response to receiving the first tag input, determining a first geographic location of the media-playback device using the location-determining device; transmitting a first location tag to a media server, wherein the first location tag includes the first geographic location and is usable by the media server to associate a media content item with the first geographic location; receiving a second tag input; in response to receiving the second tag input, determining a second geographic location of the media-playback device using the location-determining device; and transmitting a second location tag to the media server, wherein the second location tag includes the second geographic location and is usable by the media server to associate a media content item with the second geographic location; and defining the route, wherein the route includes the first and the second geographic locations.

Further, in at least some example methods, the set of media content items comprise at least one voice-over audio file and at least one music audio file. In some examples, the media content item is the voice-over audio file and wherein playing the media content item comprises playing the voice-over audio file while at least one music audio file is playing. Further, in some examples, a volume at which the at least one music audio file is played is decreased while the voice-over audio file is played.

At least some example methods further comprise receiving a voice-over tag input; in response to receiving the voice-over tag input: determining a geographic location of the media-playback device using the location-determining device; and recording an audio file using the audio recording device; and transmitting a location tag and the audio file to a media server, wherein the location tag includes the geographic location and is usable by the media server to associate the audio file with the geographic location.

In at least some example methods, the playlist data further comprise at least one offset value associated with at least one of the media content items of the set, wherein the offset value specifies a temporal offset for playback of the media content item. In some examples, playing the media content item comprises playing the media content item starting at a point into the media content item equal to the offset value.

In at least some example methods, the playlist data defining a route include trajectory data. In some examples, the trajectory data include at least one of a velocity value, and a direction of travel value. Some example methods further comprise determining trajectory information for the media-playback device based on location data from the location-determining device; and wherein the media content item in the location-based playlist is identified based on the determined geographic location and the determined trajectory information. Further, in some examples, determining the trajectory information comprises determining using the location-determining device a second location of the media-playback device and calculating a change in the location of the media-playback device.

Further, at least some example methods comprise playing a current media content item from the location-based playlist; determining a geographic location of the media-playback device using the location-determining device; determining a distance from the determined geographic location and a geographic location associated with a destination media content item in the location-based playlist; and adjusting the playback of the current media content item based on the distance. In some examples, the playback of the current media content item is adjusted by changing the tempo of the current media content item. Additionally, in some examples, the destination media content item is a media content item in the location-based playlist associated with a geographic location that the mobile device has not yet visited. Further, some example methods further comprise determining trajectory data for the media-playback device and wherein the playback of the current media content item is adjusted based on the distance and the trajectory data.

BRIEF DESCRIPTION OF THE DRAWINGS

FIG. 8 illustrates an example user interface of a media-playback device.

FIG. 9 is another illustration of the user interface shown in FIG. 8.

FIG. 10 is another illustration of the user interface shown in FIG. 8.

FIG. 11 is another illustration of the user interface shown in FIG. 8.

DETAILED DESCRIPTION

Figure 1:
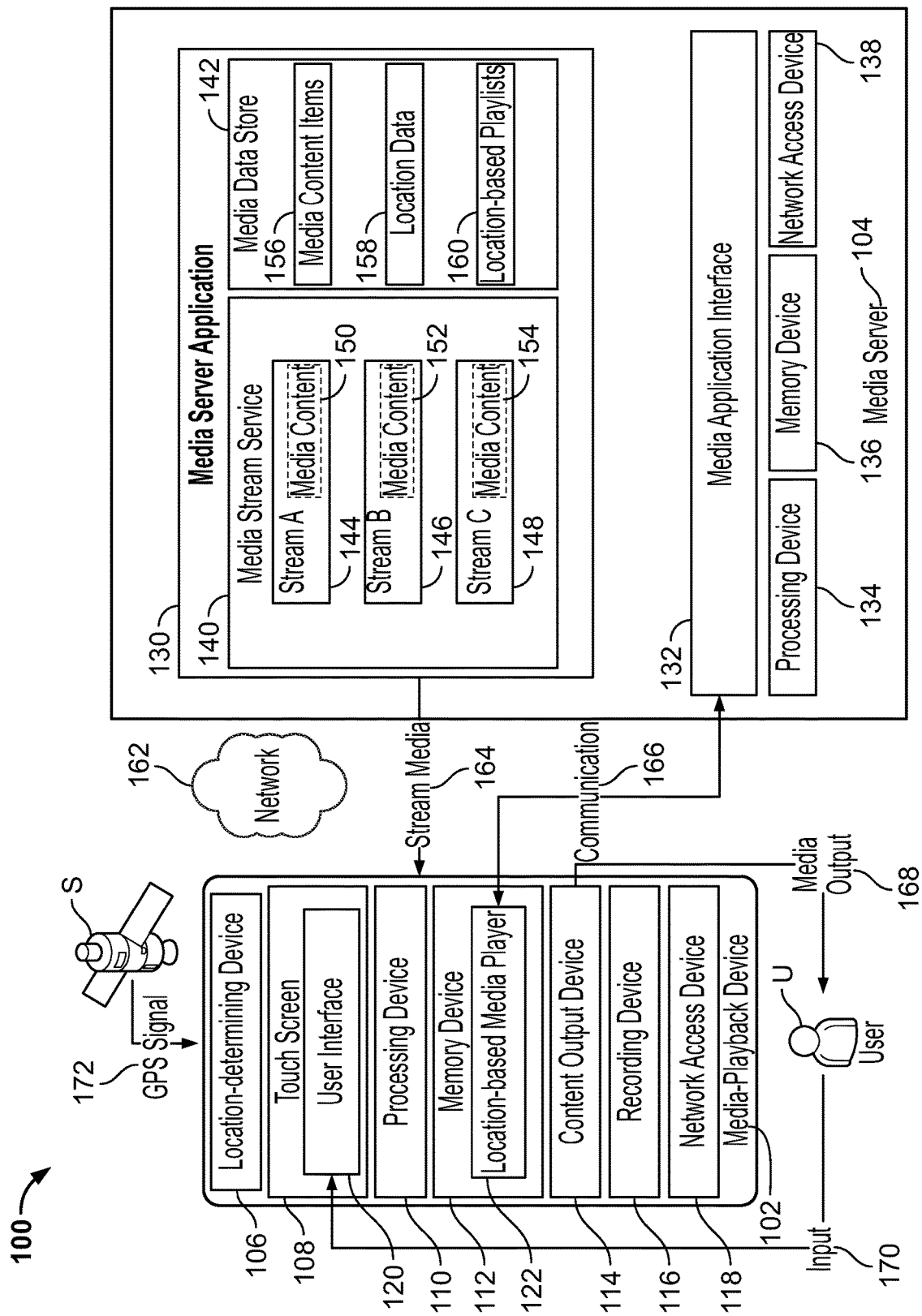
FIG. 1 illustrates an example system for location-based tagging and retrieving of media content.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Consumers often desire that particular media content is played during a particular moment or situation, such as while approaching a work place, entering a neighborhood, or approaching an obstacle. This desire cannot be met with traditional media-playback devices and media servers.

FIG. 1 illustrates an example system 100 for location-based tagging and retrieving of media content. The example system 100 includes a media-playback device 102 and a media server 104. Also shown is a network 162, a user U, and satellites S.

The media-playback device 102 operates to play media content that is provided by the media server 104, or from another system or peer device. In some embodiments, the media-playback device 102 is a computing system, handheld entertainment device, smartphone, tablet, or other type of media device capable of playing media content. The media-playback device 102 includes a location-determining device 106, a touch screen 108, a processing device 110, a memory device 112, a content output device 114, a recording device 116, and a network access device 118. Other embodiments may include different or fewer components. For example, some embodiments do not include one or both of the touch screen 108 and the recording device 116.

The location-determining device 106 is a device that determines the location of the media-playback device 102. In some embodiments, the location-determining device uses one or more of the following technologies: Global Positioning System (GPS) technology which may receive GPS signals 172 from satellites S, cellular triangulation technology, network-based location identification technology, Wi-Fi positioning systems technology, and combinations thereof.

The touch screen 108 operates to receive an input 170 from a selector (e.g., a finger, stylus etc.) controlled by the user U. In some embodiments, the touch screen 108 operates as both a display device and a user input device. In some embodiments, the touch screen 108 detects inputs based on one or both of touches and near-touches. In some embodiments, the touch screen 108 displays a user interface 120 for interacting with the media-playback device 102. As noted above, some embodiments do not include a touch screen 108. Some embodiments, include a display device and a separate user interface device.

In some embodiments, the processing device 110 comprises one or more central processing units (CPU). Other embodiments are possible as well.

The memory device 112 operates to store data and instructions. In some embodiments, the memory device 112 stores instructions for a location-based media player 122.

The memory device 112 typically includes at least some form of computer-readable media. Computer readable media includes any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the media-playback device 102.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 114 operates to output media content. In some embodiments, the content output device 114 generates media output 168 for the user U. Examples of the content output device 114 include a speaker, an audio output jack, a Bluetooth transmitter, a display panel, and a video output jack. Other embodiments are possible as well.

The recording device 116 operates to record content, such as audio or video content. In at least some embodiments, the recording device 116 operates to record a voice-over input, such as is described with reference to FIG. 5. Examples of the recording device 116 include a microphone and a camera. Other embodiments are possible as well.

The network access device 118 operates to communicate with other computing devices over a network. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The media server 104 operates to stream media 164 to media-playback devices such as the media-playback device 102. In some embodiments, the media server 104 includes a media server application 130, a media application interface 132, a processing device 134, a memory device 136, and a network access device 138. The processing device 134, memory device 136, and network access device 138 may be similar to the processing device 110, memory device 112, and network access device 118 respectively, which have been previously described.

In some embodiments, the media server application 130 operates to stream music, video, or other forms of media content. The media server application includes a media stream service 140 and a media data store 142. The media stream service 140 can be used to buffer media content such as media content 150, 152, and 154, for streaming to one or more streams 144, 146, and 148.

The media application interface 132 can receive requests or other communication from media devices or other systems, to retrieve media content from the media server 104. For example, in FIG. 1, the media application interface 132 receives communication 166 from the location-based media player 122.

The media data store 142 stores media content items 156, location data 158, and location-based playlists 160. The media data store 142 may comprise one or more databases and file systems. Other embodiments are possible as well. The media content items 156 may be audio, video, or any other type of media content, which may be stored in any format for storing media content.

The location data 158 operates to identify a location, for example by a GPS coordinate. In some embodiments, the location data 158 defines a region corresponding to a location. For example, the region may be represented by a GPS coordinate and a numeric value representing a radius to which the region extends around the GPS coordinate. As another example, the region may be defined using three or more GPS coordinates. Other embodiments are possible as well.

The location-based playlists 160 operate to identify one or more of the media content items 156 and associate the media content items 156 with the location data 158. In some embodiments, the location-based playlists 160 identify a group of the media content items 156 in a particular order. In other embodiments, the location-based playlists 160 merely identify a group of the media content items 156 without specifying any particular order. Some, but not necessarily all, of the media content items 156 included in a location-based playlist are associated with the location data 158. In some embodiments, the location-based playlists 160 also specify a relationship between the media content items in the playlist. For example, a rule may specify that the media content items must be accessed in a particular order. Other embodiments are possible as well.

Each of the media-playback device 102 and the media server 104 can include additional physical computer or hardware resources. In at least some embodiments, the media-playback device 102 communicates with the media server 104 via the network 162.

Although in FIG. 1 only a single media device and media server is shown, in accordance with an embodiment, the media server can support the simultaneous use of multiple media devices, and/or the media device can simultaneously access media content at multiple media servers. Additionally, although FIG. 1 illustrates a streaming media based system for location-based tagging and retrieving of media content, other embodiments are possible as well. For example, in some embodiments, the media-playback device 102 includes a media data store 142 and the media-playback device 102 is configured to perform location-based tagging and retrieving of media content without accessing the media server 104. Such a media data store can store previously streamed media content.

In accordance with various embodiments, the media server 104 can be used to stream, progressively download, or otherwise communicate music, video, or other forms of media content items to the media-playback device 102, wherein the location-based media player 122 is configured to tag and retrieve media content items from the media server 104 based on a location determined by the location-determining device 106. In accordance with an embodiment, a user U can direct the input 170 to the user interface 120 to issue requests, for example, to play a selected location-based playlist on the media-playback device 102 or to tag a media content item with location data.

Figure 2:
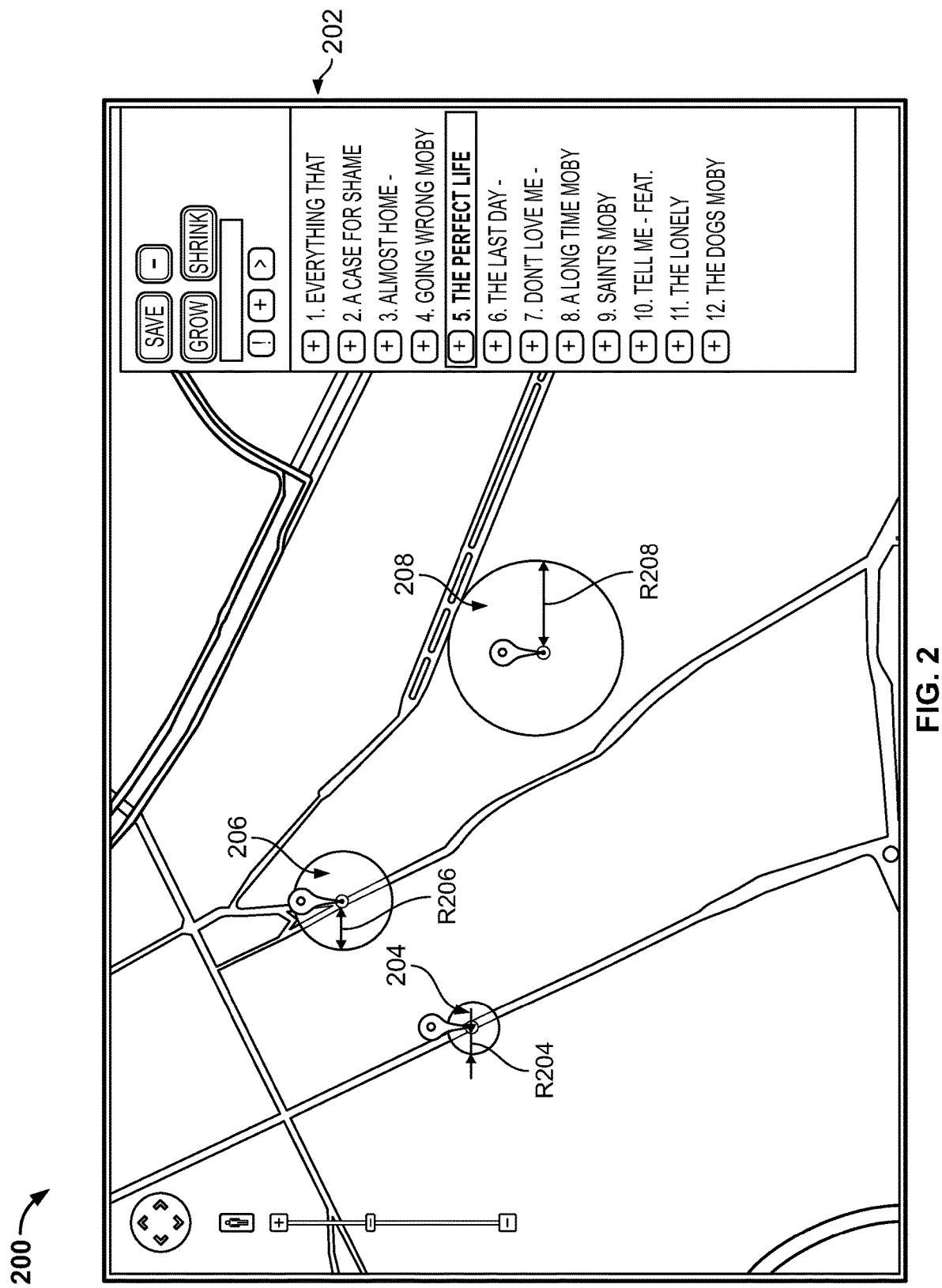
FIG. 2 illustrates a map with an overlay of an example location-based playlist.

FIG. 2 illustrates a map with an overlay of an example location-based playlist 200. In this example, the location-based playlist 200 includes the media content item list 202, which in this case lists twelve media content items. Three of the media content items in the example location-based playlist 200 are associated with the location tags 204, 206, and 208. Each of the location tags 204, 206, and 208 identify locations associated with a media content item from the location-based playlist 200. The location tags 204, 206, and 208 are associated with radius values R204, R206, and R208 respectively. The radius values R204, R206, and R208 define the size of the circular regions defined by the location tags 204, 206, and 208. As shown in FIG. 2, the radius value may vary for each of the location tags.

In some embodiments, when the media-playback device 102 determines that it is within one of the regions associated with the location tags 204, 206, and 208, the media-playback device 102 will begin to play the associated media content item. In some embodiments, a location tag can additionally specify an offset value that indicates a temporal offset into the media content item. In this manner, the location-based playlist 200 can cause the media content item to begin playing at a desired starting point. For example, a temporal offset of 30 seconds will skip the first 30 seconds of the media content item and will begin playback at a point 30 seconds into the media content item. In some embodiments, for example, the media content item and the offset in the location tag are set based on a currently playing media content item at the time the location tag is generated.

Figure 3:
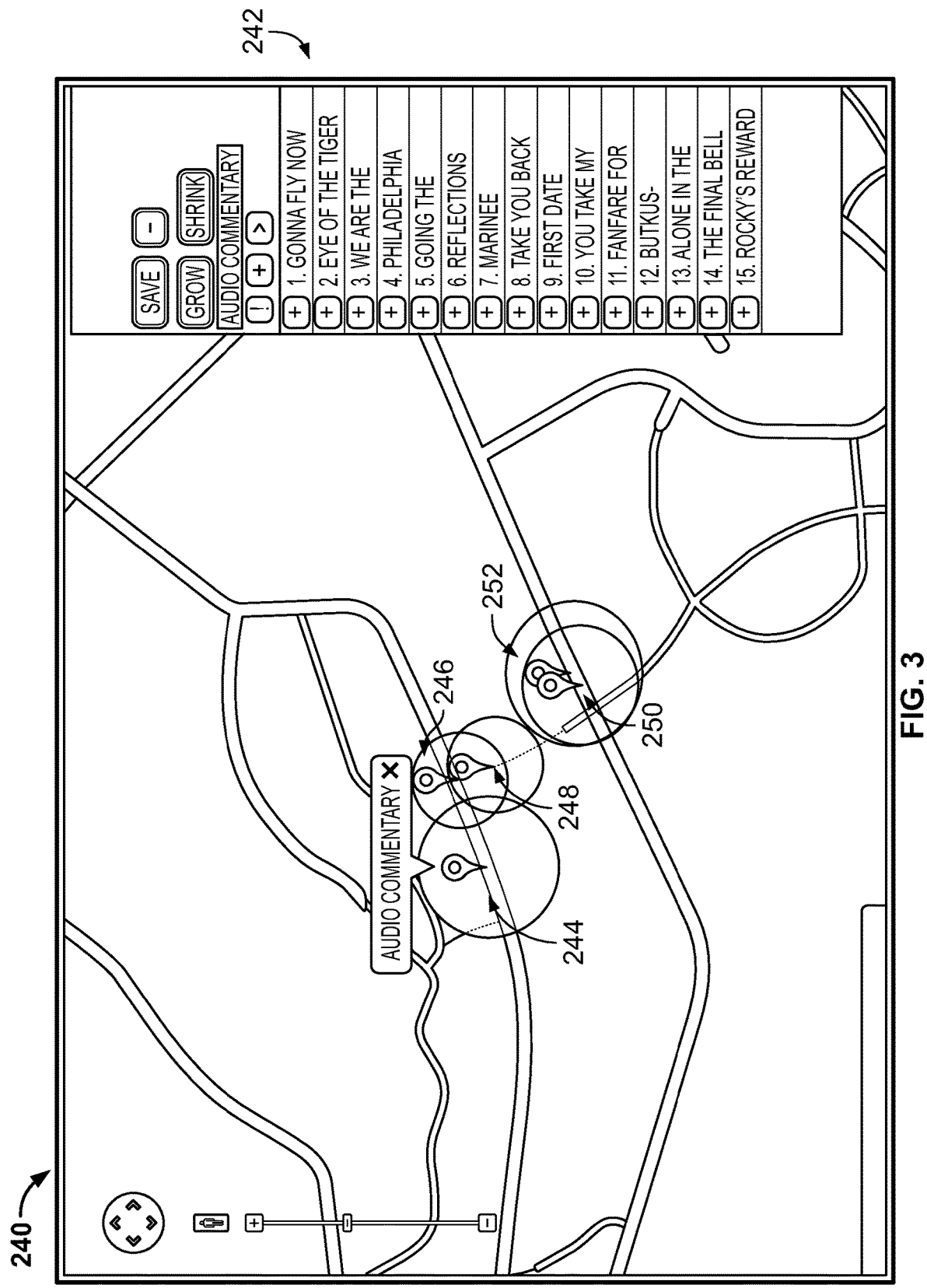
FIG. 3 illustrates a map with an overlay of an example location-based playlist that includes a voice-over media content item.

FIG. 3 illustrates a map with an overlay of an example location-based playlist 240 that includes a voice-over media content item. In this example, the location-based playlist 200 includes the media content item list 242, which in this case lists fifteen media content items. Five of the media content items in the example location-based playlist 240 are associated with the location tags 244, 246, 248, 250, and 252. Each of the location tags 244, 246, 248, 250, and 252 identify locations associated with a media content item from the location-based playlist 200.

In this example, the location tag 244 is associated with a voice-over media content item. In at least some embodiments, the voice-over media content is not dynamically synthesized (as, for example, in GPS navigation devices used in automobiles). Instead, the voice-over media content may be static content such as a previously recorded voice-over item or a voice-over item recorded live during a tagging process. The voice-over media content item may include an audio file that was recorded by the user U (or another user) of the media-playback device 102. In some embodiments, the voice-over media content item is played when the media-playback device 102 determines that it is within the region associated with the location tag 244. In some embodiments, the voice-over media content is played on its own. In other embodiments, the voice-over media content is played on top of the media content item that is currently playing when the user enters the region (e.g., by lowering the volume of the currently playing media content item).

In some embodiments, the voice-over media content item can provide route-specific information. For example, the voice-over media content item may include a recording that says "Take the next right." Alternatively, the voice-over media content may be recorded and associated with a location as a warning. For example, the voice-over media content item may include a recording that says "Turn around, you are going the wrong way." The voice-over can also provide a motivational message. For example, when the location-based playlist is designed to accompany a fitness route (e.g., hiking, running, etc.), the recording may say "Keep going—you can do it!" at a particularly challenging part of the route. Other embodiments are possible as well.

Figure 4:
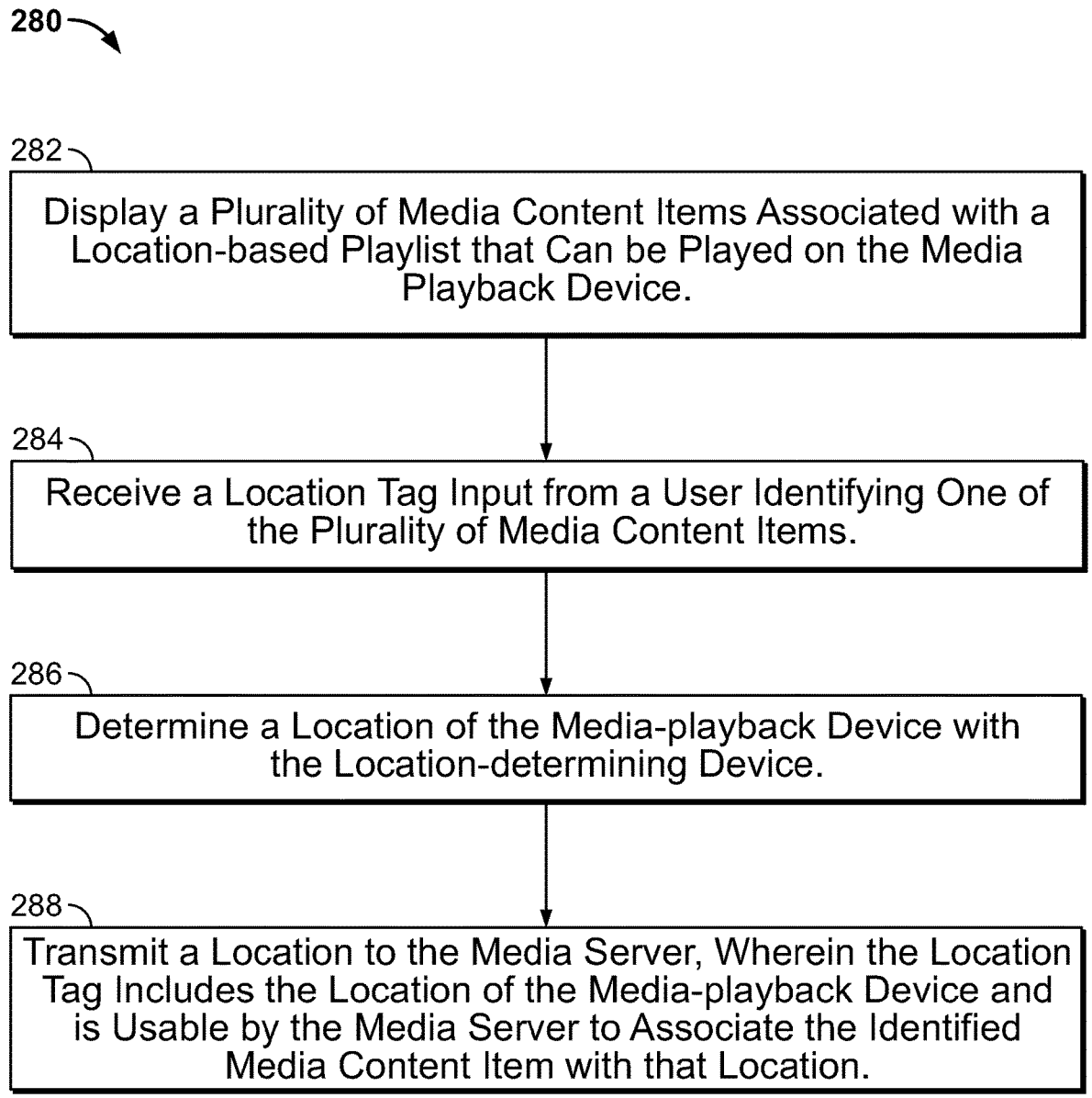
FIG. 4 illustrates a method of tagging a media content item performed by some embodiments of a media-playback device in conjunction with a media-server.

FIG. 4 illustrates a method 280 of tagging a media content item performed by some embodiments of the media-playback device 102 in conjunction with the media-server 104.

At operation 282, the user interface 120 of the media-playback device 102 displays a plurality of media content items associated with a location-based playlist that can be played on the media-playback device are displayed. An example of the user interface 120 displaying a plurality of media content items is illustrated in FIG. 9. In some embodiments, the list may be scrollable such that only a portion of the media content items associated with the location-based playlist. In some embodiments, the media-playback device 102 receives a list of media content items from the media-server. In other embodiments, the media-playback device may maintain a local copy of the location-based playlist and the media content items associated with the location-based playlist.

At operation 284, the media-playback device 102 receives a location tag input from a user identifying one of the plurality of media content item. The location tag input may be received at the user interface 120, such as by touching the portion of the displayed list corresponding to the identified media content item. In some embodiments, the user interface 120 includes "tag" actuatable controls for each of the displayed media content items that when actuated operate as location tag inputs. In some embodiments, a physical control or button may operate as a location tag input. Additionally, in some embodiments, the currently playing media content item is identified as the media content item to be tagged. In addition, in some embodiments, the current temporal location in the currently playing media content item is used as an offset that is stored with the location tag.

At operation 286, the location-determining device 106 determines a location of the media-playback device 102. In addition to determining a location of the media-playback device 102, in some embodiments trajectory data is also determined for the media-playback device 102. For example, the trajectory data may include one or more of a movement direction and a velocity. The trajectory data may be determined by determining and comparing the location of the media-playback device 102 at different times. Other embodiments are possible as well.

At operation 288, the media-playback device 102 transmits a location tag to the media server 104, wherein the location tag includes the location of the media-playback device and is usable by the media server to associate the identified media content item with that location. The media server 104 operates to receive the location tag from the media-playback device 102. In some embodiments, in response to receiving the location tag from the media-playback device 102, the media server 104 adds a record for the location to the location data 158 of the media data store 142 and updates the appropriate location-based playlist in the location-based playlists 160 to associate the identified media content item with the newly added location data record. Other embodiments are possible as well.

In some embodiments, the media-playback device 102 operates to further receive additional information about the region associated with the location tag. For example, the user interface 120 may prompt the user U to enter a radius for the region. Alternatively or additionally, the user interface 120 may prompt the user U to move the media-playback device 102 to a second location to define the radius of the region. Additionally, in some embodiments, the user U define region by identifying multiple locations that surround the region. Other embodiments are possible as well.

Figure 5:
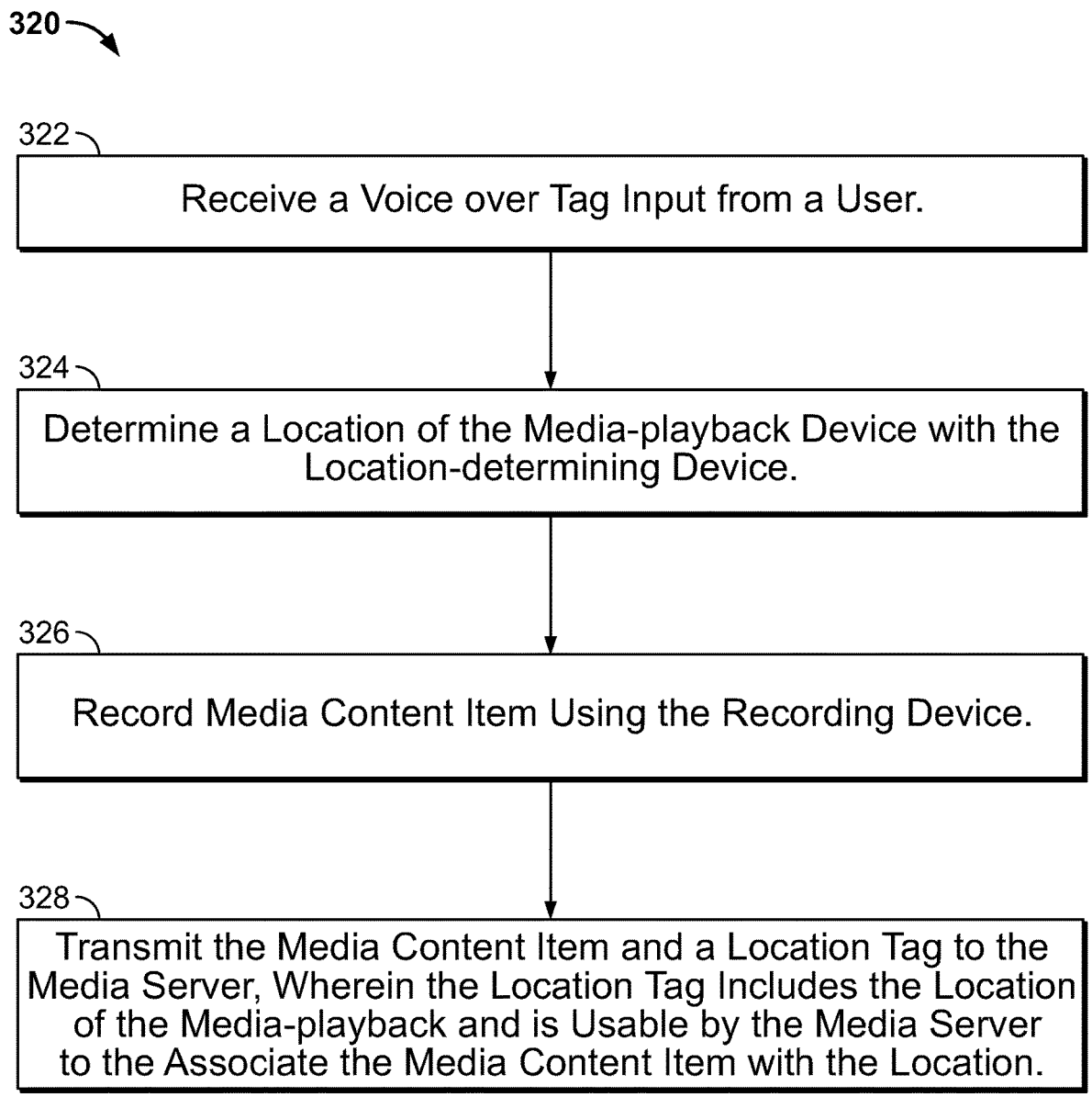
FIG. 5 illustrates a method of generating and tagging a voice-over media content item.

FIG. 5 illustrates a method 320 of generating and tagging a voice-over media content item performed by some embodiments on the media-playback device 102 in conjunction with the media-server 104.

At operation 322, the media-playback device 102 receives a user input from a user to add a voice-over tag. In some embodiments, the user input is received through the user interface 120, such as by receiving a touch to an actuatable control associated with adding a voice-over tag. Examples of the user interface 120 displaying actuatable controls for adding voice-over tags are shown in FIGS. 9 and 11.

At operation 324, the location-determining device 106 determines a location of the media-playback device 102. This operation 324 may be similar to operation 286, which has been described previously with respect to FIG. 4.

At operation 326, the media-playback device records a media content item using the recording device 116. In some embodiments, the media content item comprises audio content that is recorded to an audio file stored in any of the various file formats usable for storing audio data. In other embodiments, the media content item is video content or another type of media content. Examples of audio content include songs, albums, podcasts, audiobooks, etc. Examples of video content include movies, music videos, television episodes, etc.

At operation 328, the media-playback device 102 transmits the media content item and a location tag to the media server. This operation 328 may be similar to operation 288, which is described above with respect to FIG. 4. However, in some embodiments, operation 328 additionally transmits the media content item to the media server 104. Upon receiving the media content item, the media server 104 adds the media content item to the media content items 156 of the media data store 142. However, in other embodiments, the media content item may be stored locally on the media-playback device and is not transmitted to the media server 104.

Figure 6:
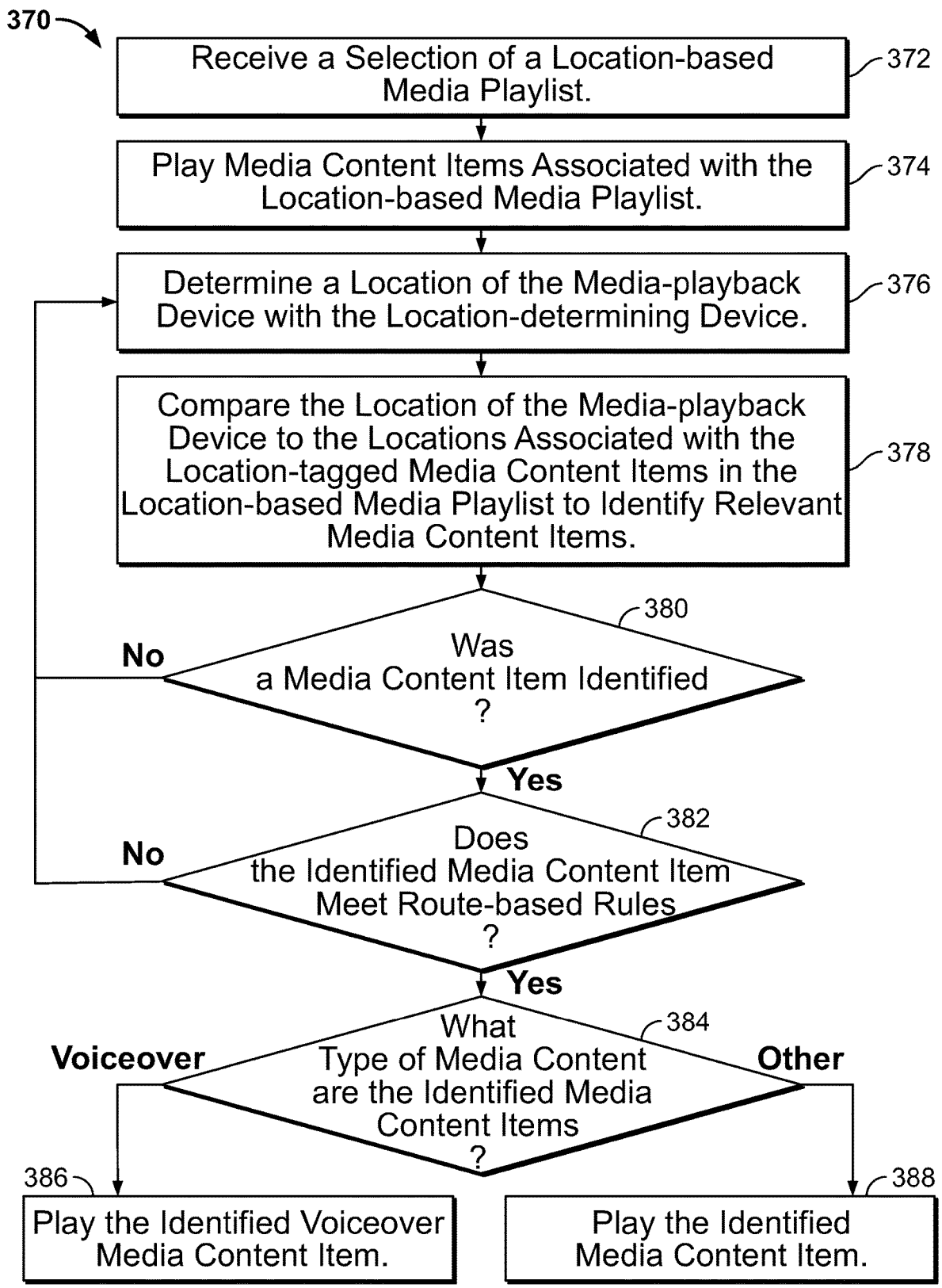
FIG. 6 illustrates a method of playing a location-tagged playlist.

FIG. 6 illustrates a method 370 of playing a location-tagged playlist performed by some embodiments on the media-playback device 102 in conjunction with the media-server 104.

At operation 372, the media-playback device 102 operates to receive a selection of a location-based media playlist. In at least some embodiments, the selection is received as a touch input on the touch screen 108 at a location defined by the user interface 120.

At operation 374, the media-playback device 102 plays media content items associated with the selected location-based media playlist. In at least some embodiments, the media content items are played in a random order (i.e., the media content items are shuffled). In other embodiments, the media content items are played in an order defined by the location-based media playlist.

At operation 376, the location-determining device 106 determines the location of the media-playback device 102. Additionally, in some embodiments, the location-determining device 106 determines trajectory data, as has been described previously, relating to the media-playback device 102.

At operation 378, the media-playback device 102 compares the determined location to the locations associated with the location-tagged media content items in the location-based media playlist to identify relevant media content items. In some embodiments, a media content item is identified as relevant if the determined location of the media-playback device 102 within the region associated with the location-tagged media content items. Additionally, in some embodiments, the media content item is identified as relevant if it also matches trajectory data associated with the media-playback device 102. In some embodiments, the determined location (and, sometimes, trajectory data) is compared to the regions associated with each of the location-tagged media content items in the location-based media playlist. In other embodiments, search techniques and data structures may be used to minimize the number of regions to which the determined location of the media-playback device 102 is compared. These embodiments may be particularly useful with respect to location-based media playlists containing larger numbers of location-tagged media content items.

At operation 380, it is determined whether any media content items were identified as relevant to the location of the media-playback device 102. If not, the method proceeds to operation 376, where the location of the media-playback device 102 is determined again. However, if relevant media content items were identified, the method proceeds to operation 382.

At operation 382, it is determined whether the route-based rules associated with the identified media content items have been met. Various embodiments include various different route-based rules. In some embodiments, the route-based rule is based at least in part on at least one of: a movement direction, a velocity, an order, and an activity type. Examples of activity types include walking, running, walking up steps, biking, and riding in a vehicle, etc. In at least some embodiments, the media-playback device 102 determines an estimated activity based on or more of velocity, movement direction, and detected vertical movement of the media-playback device 102. In one example, the route-based rule requires that a media-playback device first enter a region associated with another location-tagged media content item in the location-based media playlist. In this manner, the route-based rule enforces an order in which the location-tagged media are visit. This type of route-based rule may be useful in, for example, a scavenger hunt scenario. Another example route-based rule, requires that the location-tagged media content item be played only one time. The route-based rules may be combined as well. Combinations of these route-based rules can operate to create routes that pass through the same location more than once (e.g., laps around a track) but play different media content items each time the location is entered. Other embodiments of route-based rules are possible as well.

If it is determined that the route-based rules associated with the identified media content items have not been met, the method returns to operation 376, where the location of the media-playback device 102 is determined again. If, instead, the route-based rules have been met, the method proceeds to operation 384.

At operation 384, the type of the identified media content items is evaluated. If the identified media content items include voice-over media content, the method proceeds to operation 386 where the voice-over media content is played. If the identified media content items include other media content, the method proceeds to operation 388 where the media content item is played. In some embodiments, these options are not mutually exclusive because multiple media content items may be identified as relevant and may meet all of the applicable route-based rules.

At operation 386, the media-playback device 102 plays the voice-over media content item (or items). In some embodiments, the voice-over content is played by lowering the playback volume of the currently playing media content item and play the voice-over media content item simultaneously. In other embodiments, the currently playing content is paused while the voice-over content is played. In yet other embodiments, the currently playing content is stopped altogether (and not resumed) when the voice-over content is played. If multiple voice-over media content items are to be played, they may be played simultaneously or sequentially. Other embodiments are possible as well.

At operation 388, the media-playback device 102 plays the identified media content item (or items). In some embodiments, playback of any currently playing media content items is stopped immediately and the identified media content items are played. In other embodiments, the currently playing content fades out (i.e., the volume is gradually decreased) while the identified media content item fades in (i.e., the volume is gradually increased). If multiple media content items were identified, only one of the identified content items is played in some embodiments. In other embodiments, the identified content items are played sequentially. Other embodiments are possible as well.

In some embodiments, the media-playback device 102 plays the media content items (both voice-over and other) by requesting stream media for the media content items via the media application interface 132 of the media server 104. In other embodiments, the media content items are stored locally on the media-playback device 102 and the media content items are played back using the locally stored media content items.

In some embodiments, the media-playback device 102 records that the identified media content has been played. The media-playback device 102 may record that the identified media content has been played in a database table or on file system locally. Alternatively, the media-playback device 102 may transmit a message to the media-server to indicate that the identified media content has been played. In this manner, route-based rules (which are discussed elsewhere herein) can be used to make decisions regarding playback of media content items based on whether a particular media content item has been played.

In some embodiments, after operations 386 or 388 are complete, the method returns to operation 376 to determine the location of the media-playback device 102 and repeat the method with the new location.

Figure 7:
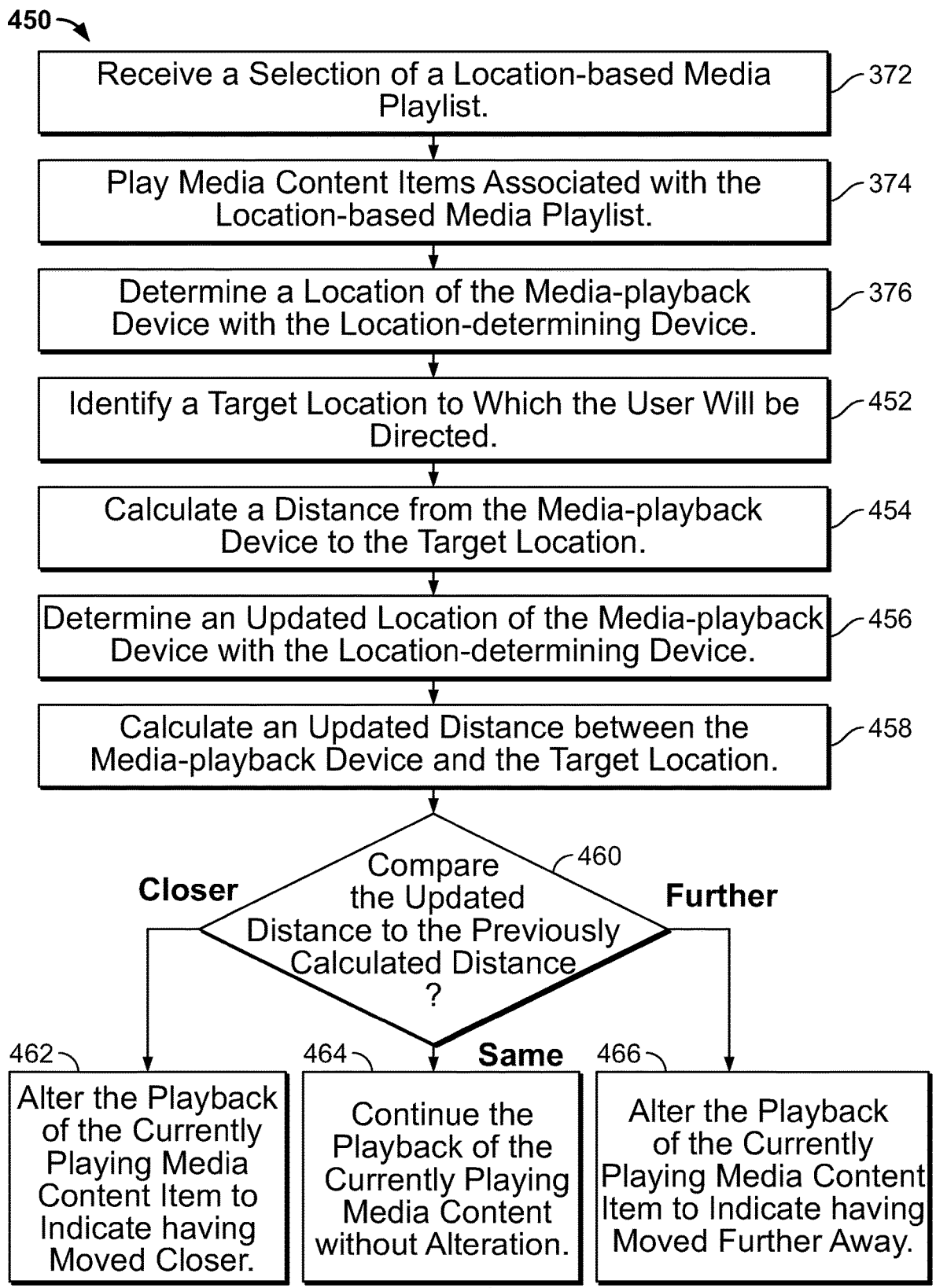
FIG. 7 illustrates a method of directing a user to a tagged location in a location-tagged playlist.

FIG. 7 illustrates a method 450 of directing a user U to a tagged location in a location-tagged media playlist performed by some embodiments of the media-playback device 102 in conjunction with the media-server 104. As described below in more detail, in some embodiments, the media-playback device 102 performs the method 450 to direct the user U to a particular location by adjusting the playback of the currently playing media content items.

In this example, the method 450 includes operations 372, 374, and 376, which have been described previously with reference to FIG. 6.

At operation 452, the media-playback device 102 identifies a target location to which the user U will be directed. In some embodiments, the target location is selected from the locations associated with the location-tagged media content items in the location-based media playlist. For example, in some embodiments, the target location is selected as the nearest location associated with a media content item in the location-based media playlist that has not yet been visited. In other embodiments, the target location is selected based on a user input that identifies a location-tagged media content item to which the user U desires to be directed. Further, some embodiments may allow the user U to select a target location that is not currently associated with a media content item in the location-based media playlist. Yet other embodiments are possible as well.

At operation 454, the media-playback device 102 calculates a distance between the current location of the media-playback device 102 and the target location. In some embodiments, the calculated distance is the straight-line distance between the locations. In other embodiments, the calculated distance is the travel distance (e.g., the distance between the locations when travelling via one of roads, trails, or public transit, etc.).

At operation 456, the media-playback device 102 determines an updated location of the media-playback device using the location-determining device 106. In some embodiments, the media-playback device 102 waits for a predetermined period of time, such as 0.5-60 seconds before determining the updated location. However, other embodiments that wait for shorter or longer predetermined time periods are possible as well. In other embodiments, the media-playback device 102 waits for a variable-length time period that is based on one or more of the speed at which the media-playback device 102 is moving and the previously calculated distance between the media-playback device 102 and the target location (e.g., the distance calculated in operation 454). In some embodiments, the variable-length time period is shorter when the media-playback device 102 is moving faster or is closer to target location than at other times. After the time period has elapsed, the location of the media-playback device 102 may be determined in a manner similar to that described in operation 376.

At operation 458, the media-playback device 102 calculates a distance between the updated location of the media-playback device 102 and the target location. Operation 458 may be similar to operation 454 except that the updated location of the media-playback device 102 is used instead of the previously determined location.

At operation 460, the updated distance from the media-playback device 102 to the target location is compared to the previously calculated distance. If the updated location is closer to the target location (e.g., the updated distance is less than the previously calculated distance), the method proceeds to operation 462. If instead the updated distance is the same as the previously-calculated distance, the method proceeds to operation 464. In some embodiments, the updated distance and the previously calculated distance are treated as being the same if the absolute value of the difference is less than a predetermined magnitude. And if the updated location is further from the target location (e.g., the updated distance is greater than the previously calculated distance), the method proceeds to operation 466.

At operation 462, the media-playback device 102 alters the playback of the currently playing media content item to indicate having moved closer. While at operation 464, the media-playback device 102 continues the playback of the currently playing media content without alteration. And at operation the media-playback device 102 alters the playback of the currently playing media content item to indicate having moved further away. In some embodiments, the alteration to the playback of the currently media content to indicate having moved closer is the opposite of the alteration to indicate having moved further away. For example, in some embodiments, the tempo of the currently playing content is increased to indicate having moved closer to the target location and the tempo is decreased to indicate having moved further away. Alternatively or additionally, in some embodiments, the volume of the currently playing content is increased to indicate having moved closer to the target location and the volume is decreased to indicate having moved further away. Other embodiments are possible as well. For example, with visual media content items such as video the brightness, contrast, or coloration of the video frames may be adjusted to indicating having moved closer to or further from the target location. In some embodiments, after operations 426, 464, or 466 have been performed, the method returns to operation 456 to determine an updated location of the media-playback device.

Although the embodiment described in FIG. 7 adjusts the playback of media content based on changes in distance from the target location, other embodiments adjust the playback of media content based on other criteria. For example, in some embodiments, the playback is adjusted at least in part based on the direction of movement or the orientation of the media-playback device 102 with respect to the target location. Yet other embodiments are possible as well.

FIGS. 8-11 illustrate an example user interface 120 of the media-playback device 102 for tagging a media content item and generating a voice-over media content item.

FIG. 8 illustrates a user interface 120 of the media-playback device 102. In FIG. 8, a list 510 of playlists is displayed by the user interface. The list 510 includes an entry 512 for a location-based playlist, titled "Geo Test List 17." The user interface 120 operates to receive a user input, such as a touch with a selector, to identify a particular playlist from the list 510. In some embodiments, when a user input identifying the entry 512 is received by the media-playback device 102, the user interface 120 is updated as shown in FIG. 9.

FIG. 9 is another illustration of the user interface 120 of the media-playback device 102. In FIG. 9, a list 520 of the media content items associated with the location based playlist titled "Geo Test List 17" is shown. The list 520 includes the entry 522 associated with a media content item titled "Almost Home." The user interface 120 operates to receive a user input, such as a touch with a selector, to identify a particular media content item from the list 520. In some embodiments, when a user input identifying the entry 522 is received by the media-playback device 102, the user interface 120 is updated as shown in FIG. 10. Additionally, FIG. 9 includes an actuatable element 524. In some embodiments, when a user input actuating the actuatable element 524 is received, the user interface 120 is updated as shown in FIG. 11.

FIG. 10 is another illustration of the user interface 120 of the media-playback device 102. In FIG. 10, a menu 530 of options for tagging the previously identified track is shown. The menu 530 includes options 532 534, and 536. When the option 532 ("Set") is actuated, the previously identified track may be associated with the current location of the media-playback device 102, such as by transmitting the current location and an identifier of the selected media content item to the media server 104. When the option 534 ("Remove") is actuated, the location tag currently associated with the previously identified track is removed. In some embodiments, the media-playback device transmits a message to the media server 104 to indicate that the location tag has been removed. When the option 536 ("Cancel") is actuated, the user interface 120 is updated to remove the menu 530. In some embodiments, after one of the options on the menu 530 is actuated, the user interface 120 is updated to return to the state shown in FIG. 9.

FIG. 11 is another illustration of the user interface 120 of the media-playback device 102. In FIG. 11, a menu 540 of options for adding a voice-over at the current location of the media-playback device 102 is shown. The menu 540 includes options 542 and 544. When the option 542 ("Record") is actuated, the media-playback device 102 may activate the recording device 116 to record a voice-over media content item. After the voice-over has been recorded, the newly recorded media content item may be transmitted to the media server 104 where it may be associated with the previously identified location-based playlist (in this example, "Geo Test List 17") and location data representing the current location of the media-playback device 102. When the option 544 ("Cancel") is actuated, the user interface 120 is updated to remove the menu 540. In some embodiments, after one of the options on the menu 540 is actuated, the user interface 120 is updated to return the state shown in FIG. 9.

FIGS. 12-21 illustrate an embodiment of a web-based interface 570 and method of using the web-based interface 570 to create and modify a location-based media playlist. In some embodiments, the web-based interface 570 may be accessed from a web browser application executing on the media-playback device. Alternatively, the web-based interface 570 may be accessed by a web browser running on a different computing system, such as a laptop or personal computer. In some embodiments, the media server 104 generates the web-based interface 570. Other embodiments are possible as well.

Figure 12:
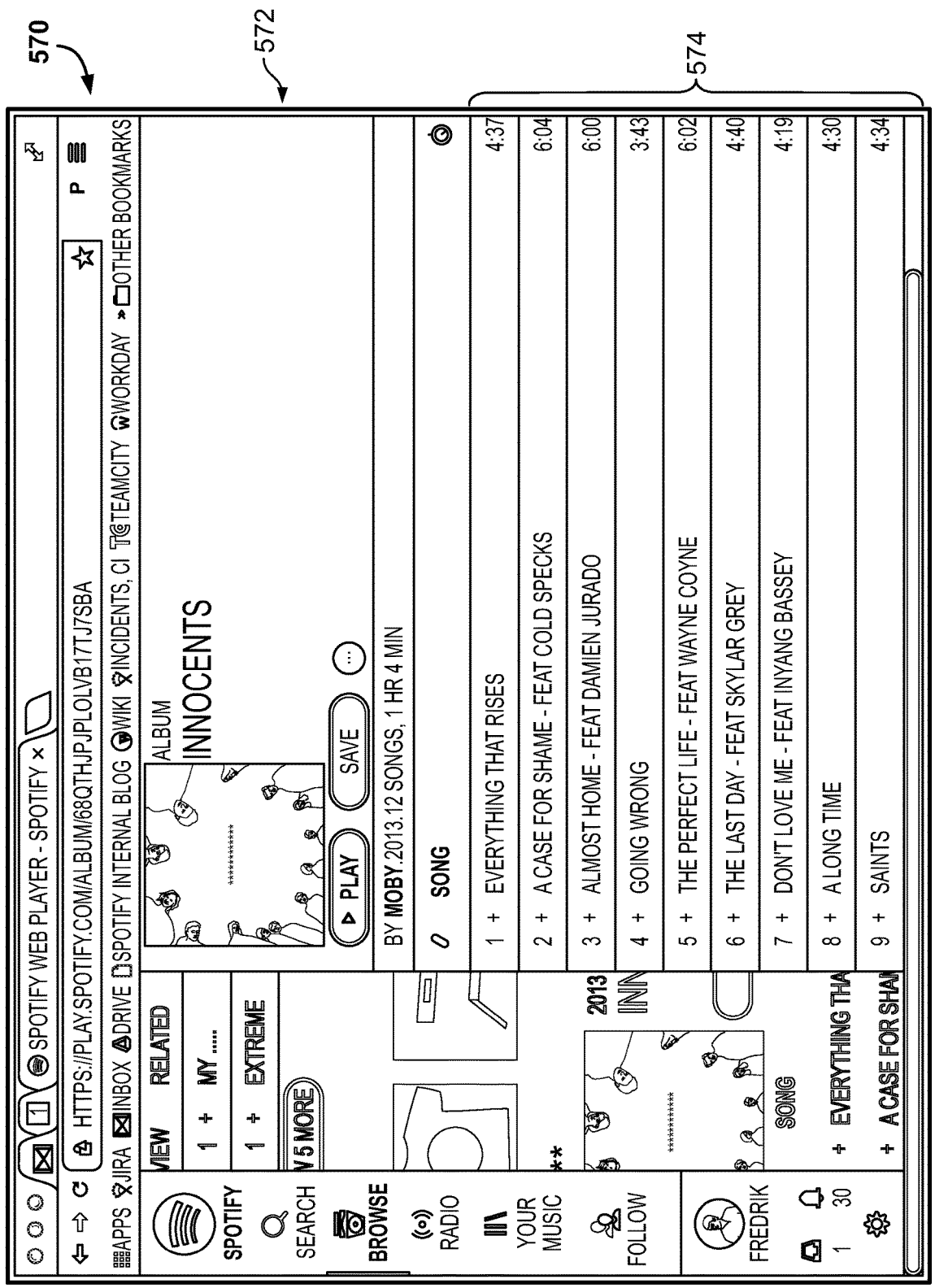
FIG. 12 illustrates an example web-based interface for creating and modifying location-based playlists.

FIG. 12 illustrates the web-based interface 570. In FIG. 12, the web-based interface 570 displays an album identifier 572, titled "Innocents" and a list 574 of media content items associated with the album identifier 572.

Figure 13:
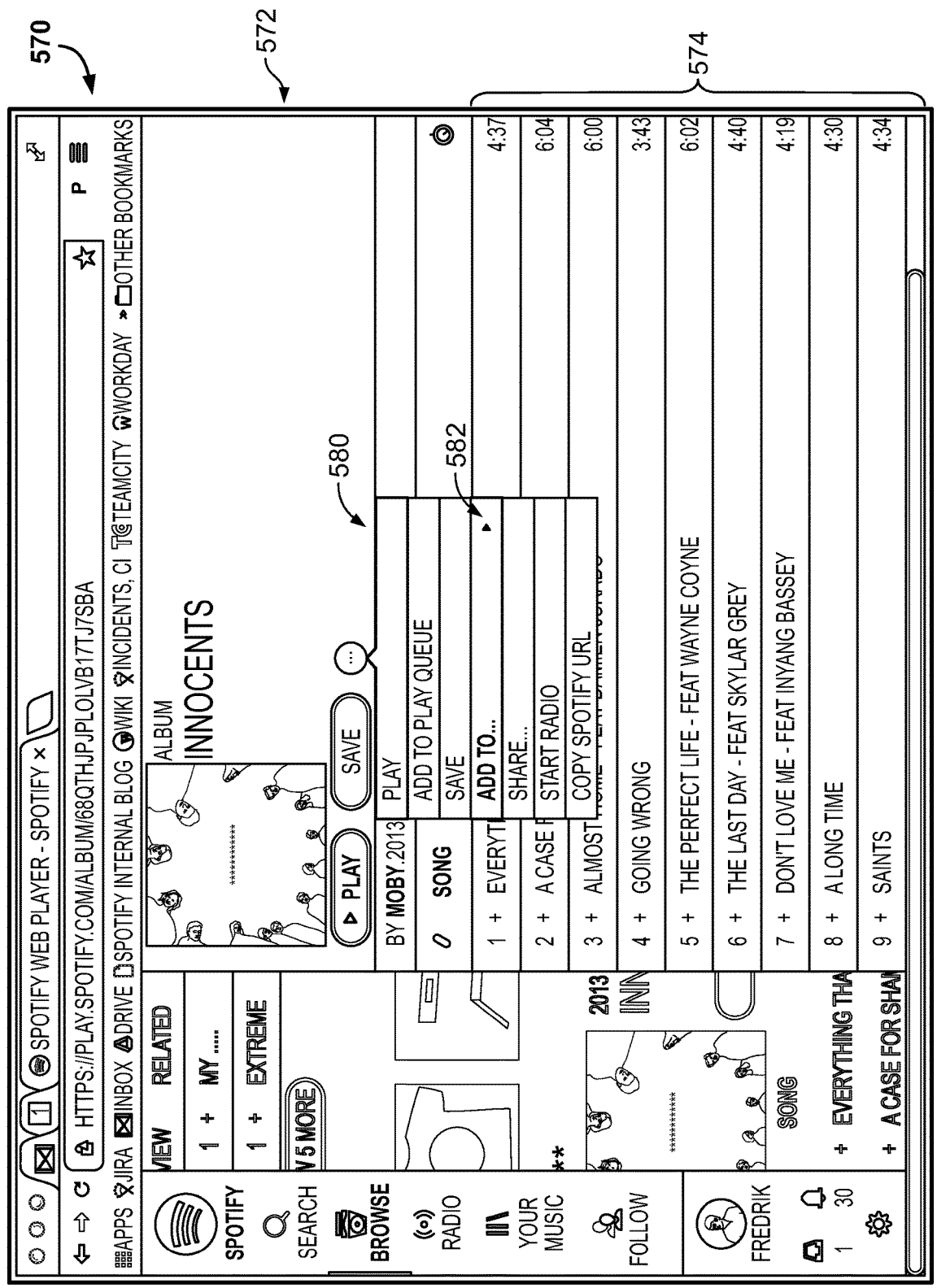
FIG. 13 is another illustration of the web-based interface shown in FIG. 12.

FIG. 13 is another illustration of the web-based interface 570. In FIG. 13, the web-based interface 570 displays a menu 580 that includes actuatable element 582, labeled "Add to . . . ." In some embodiments, when a user input actuating the actuatable element 582 is received, the web-based interface 570 is updated as shown in FIG. 14.

Figure 14:
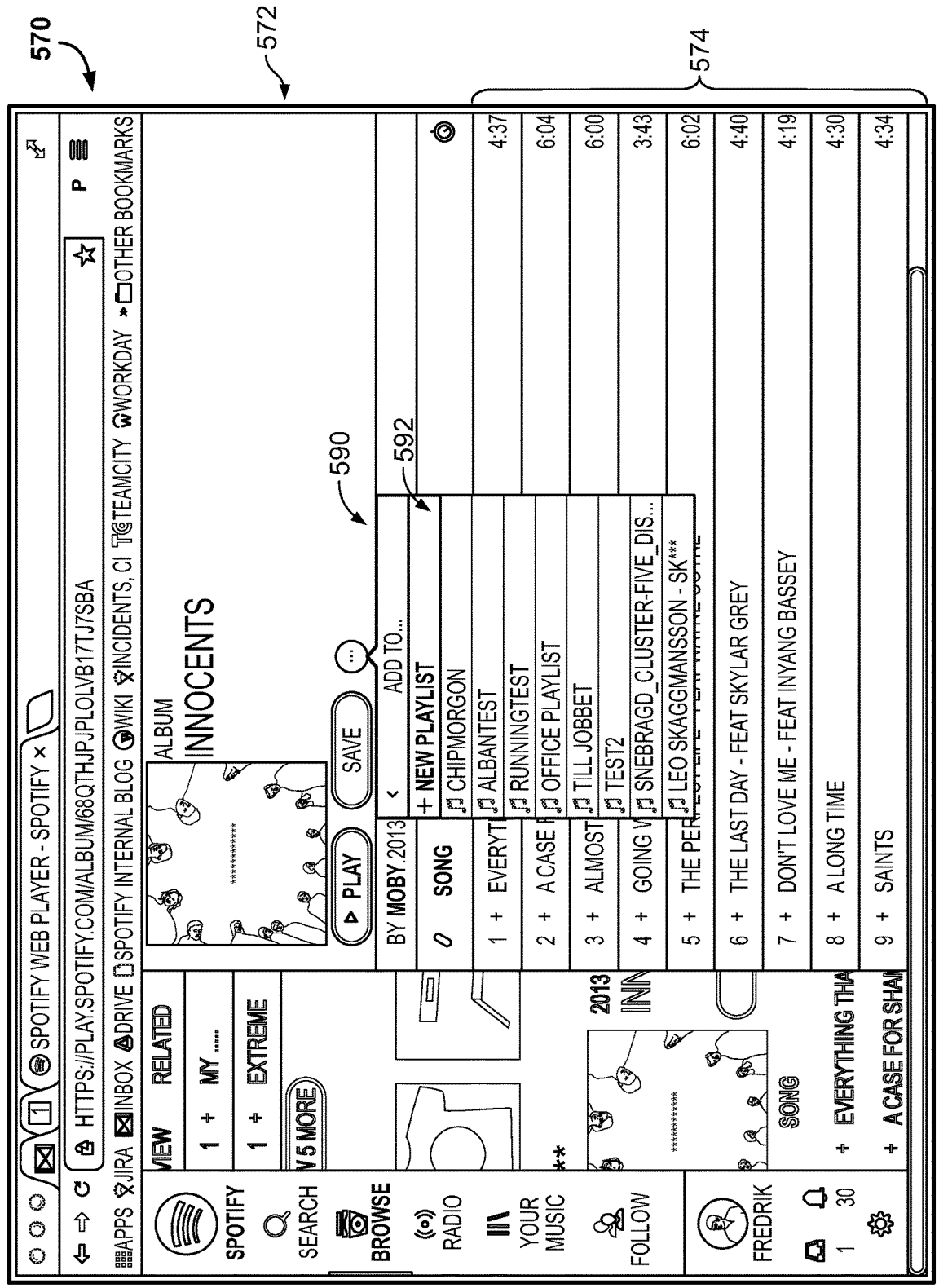
FIG. 14 is another illustration of the web-based interface shown in FIG. 12.

FIG. 14 is another illustration of the web-based interface 570. In FIG. 14, the web-based interface 570 displays a menu 590 that includes actuatable element 592, labeled "New Playlist." In some embodiments, when a user input actuating the actuatable element 592 is received, the web-based interface 570 is updated as shown in FIG. 15.

Figure 15:
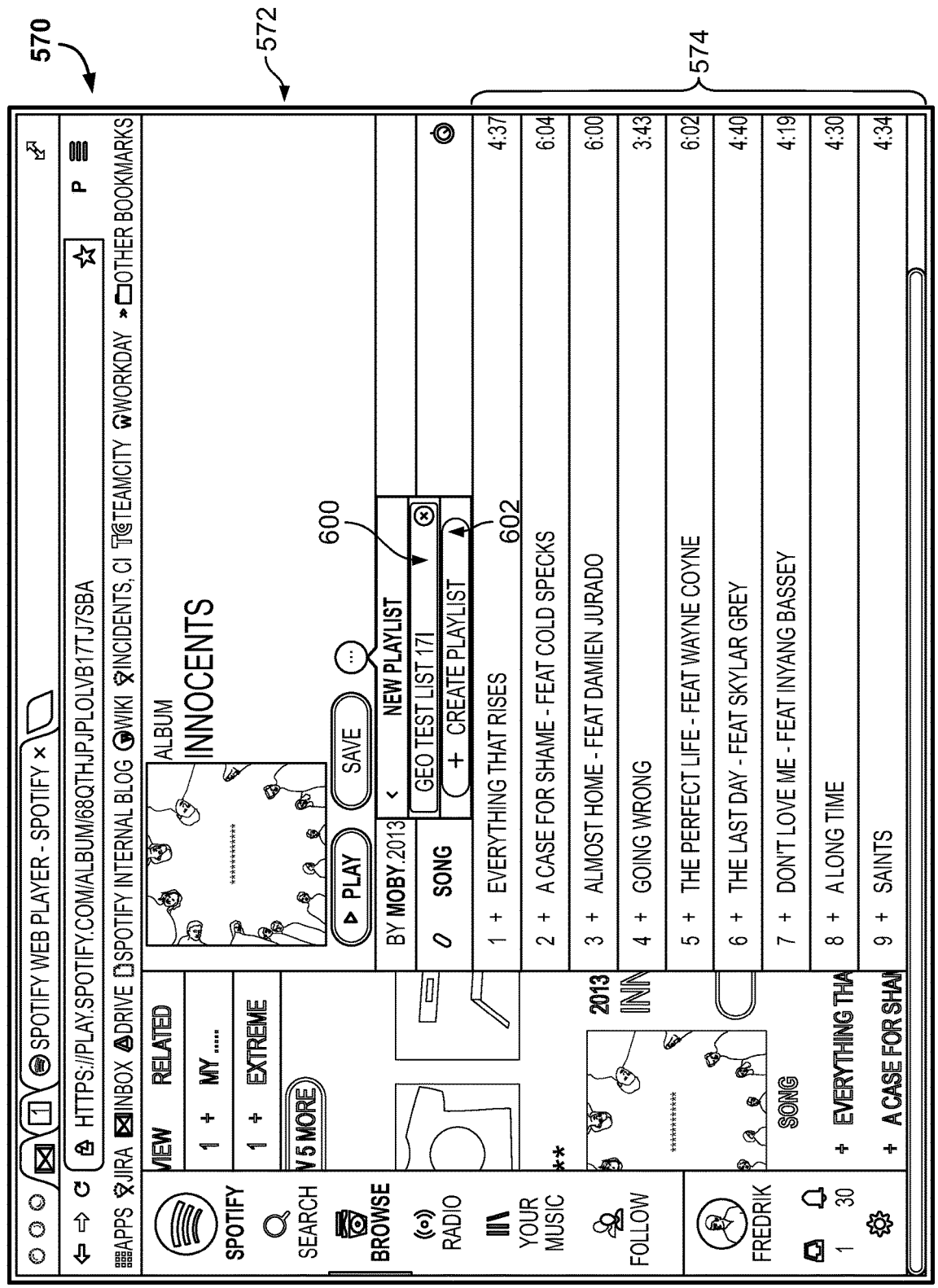
FIG. 15 is another illustration of the web-based interface shown in FIG. 12.

FIG. 15 is another illustration of the web-based interface 570. In FIG. 15, the web-based interface 570 displays a text input field 600 for entering a name for a new playlist. Additionally, the web-based interface 570 includes an actuatable element 602 to create a new playlist. In some embodiments, when a user input actuating the actuatable element 602 is received, a new location-based media playlist is created on the media server 104 that includes the media content items listed in the list 574. Additionally, in some embodiments, after the new playlist is created, the web-based interface 570 is updated as shown in FIG. 16.

Figure 16:
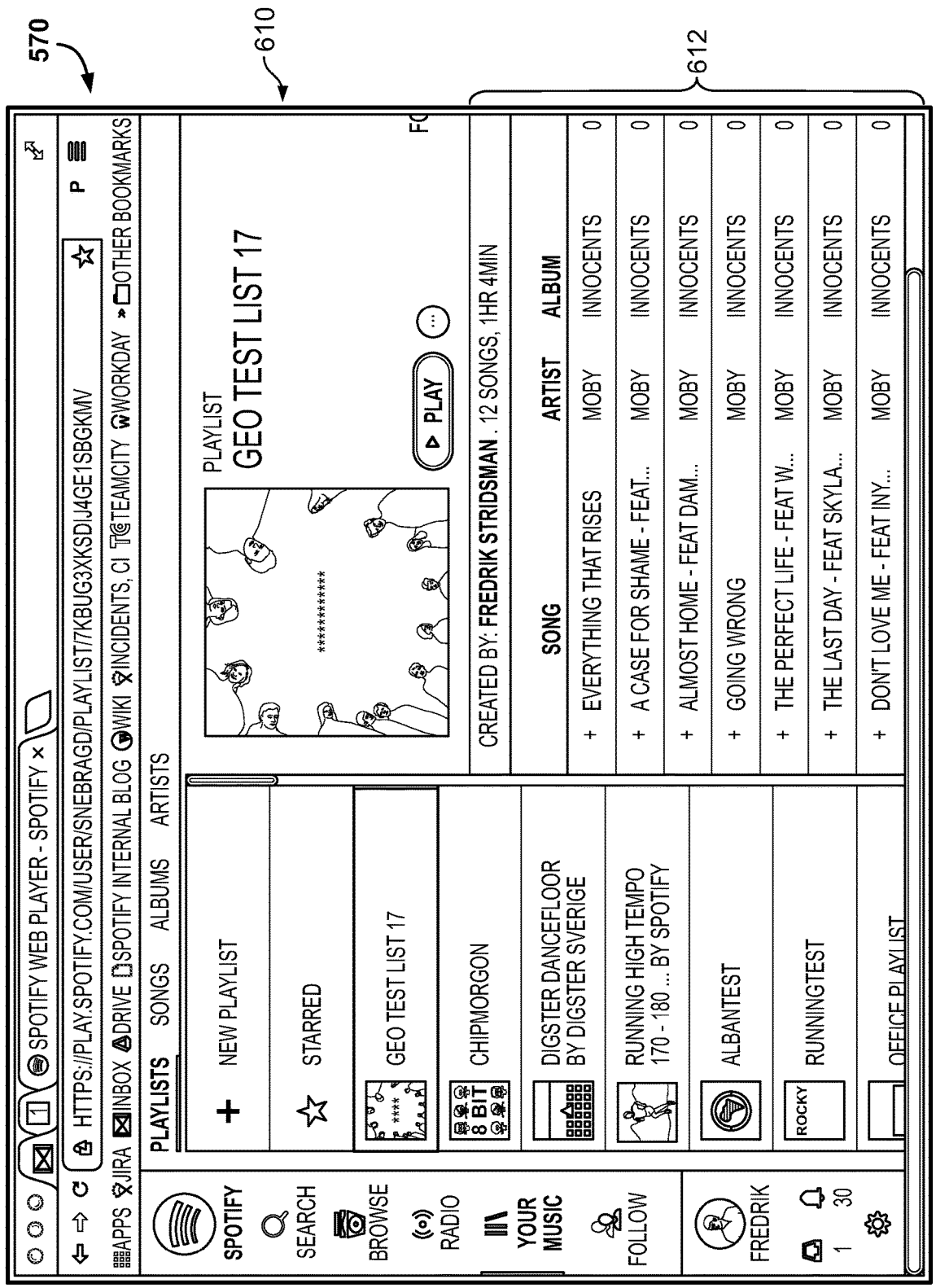
FIG. 16 is another illustration of the web-based interface shown in FIG. 12.

FIG. 16 is another illustration of the web-based interface 570. In FIG. 16, the web-based interface 570 displays a location-based media playlist identifier 610, titled "Geo Test List 17" and a list 612 of media content items associated with the location-based media playlist identifier 610.

Figure 17:
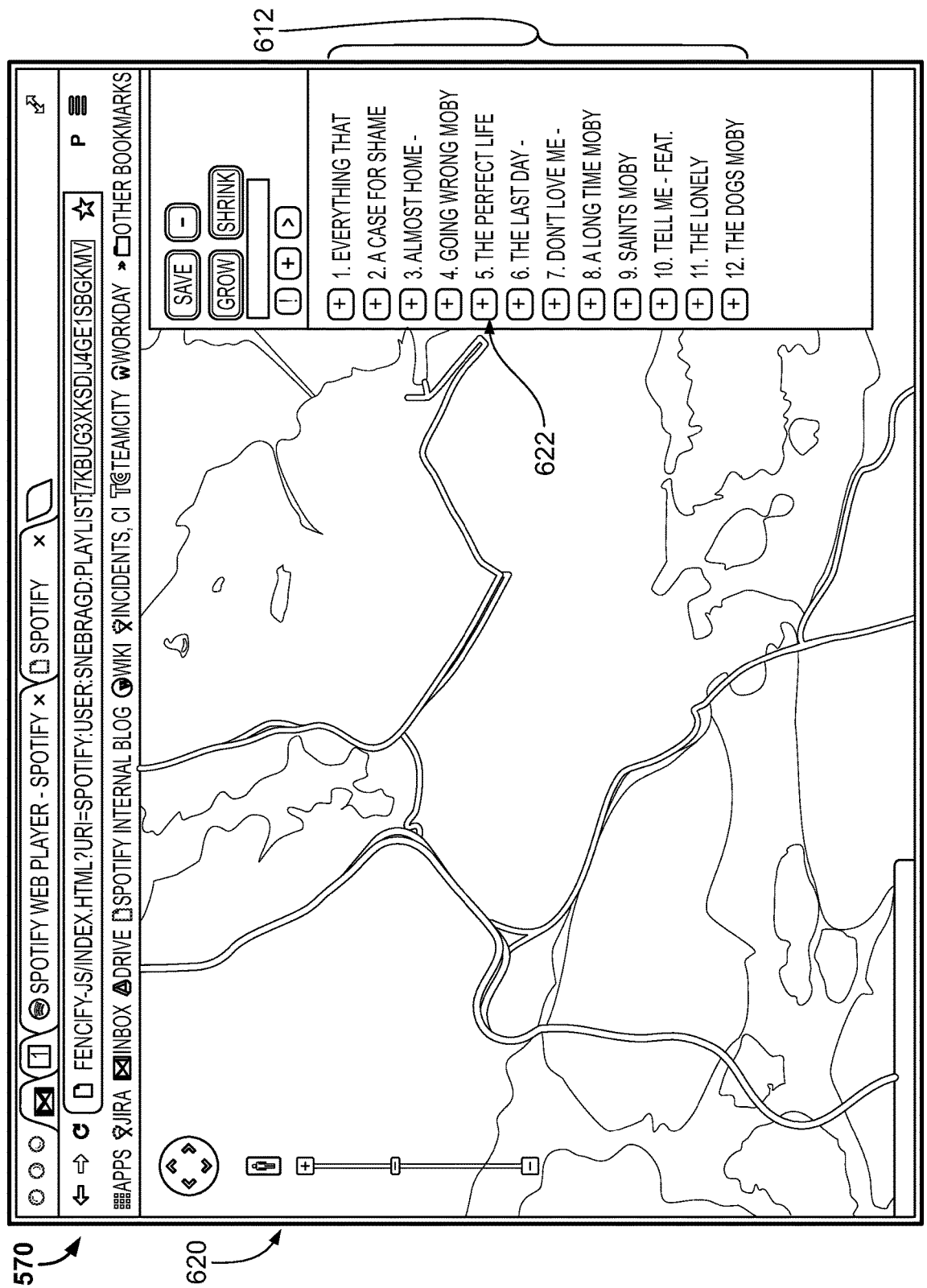
FIG. 17 is another illustration of the web-based interface shown in FIG. 12.

FIG. 17 is another illustration of the web-based interface 570. In FIG. 17, the web-based interface 570 displays a map 620 and the list 612. As will be explained in the following figures, location tags can be added to the map 620 to associate media content items in the list 612 with particular locations. In the list 612, each of the listed media content items includes an actuatable element to add a location tag. For example, the fifth media content item in the list 612 includes the actuatable element 622. In some embodiments, when a user input actuating the actuatable element 622 is received, the web-based interface 570 is updated as shown in FIG. 18.

Figure 18:
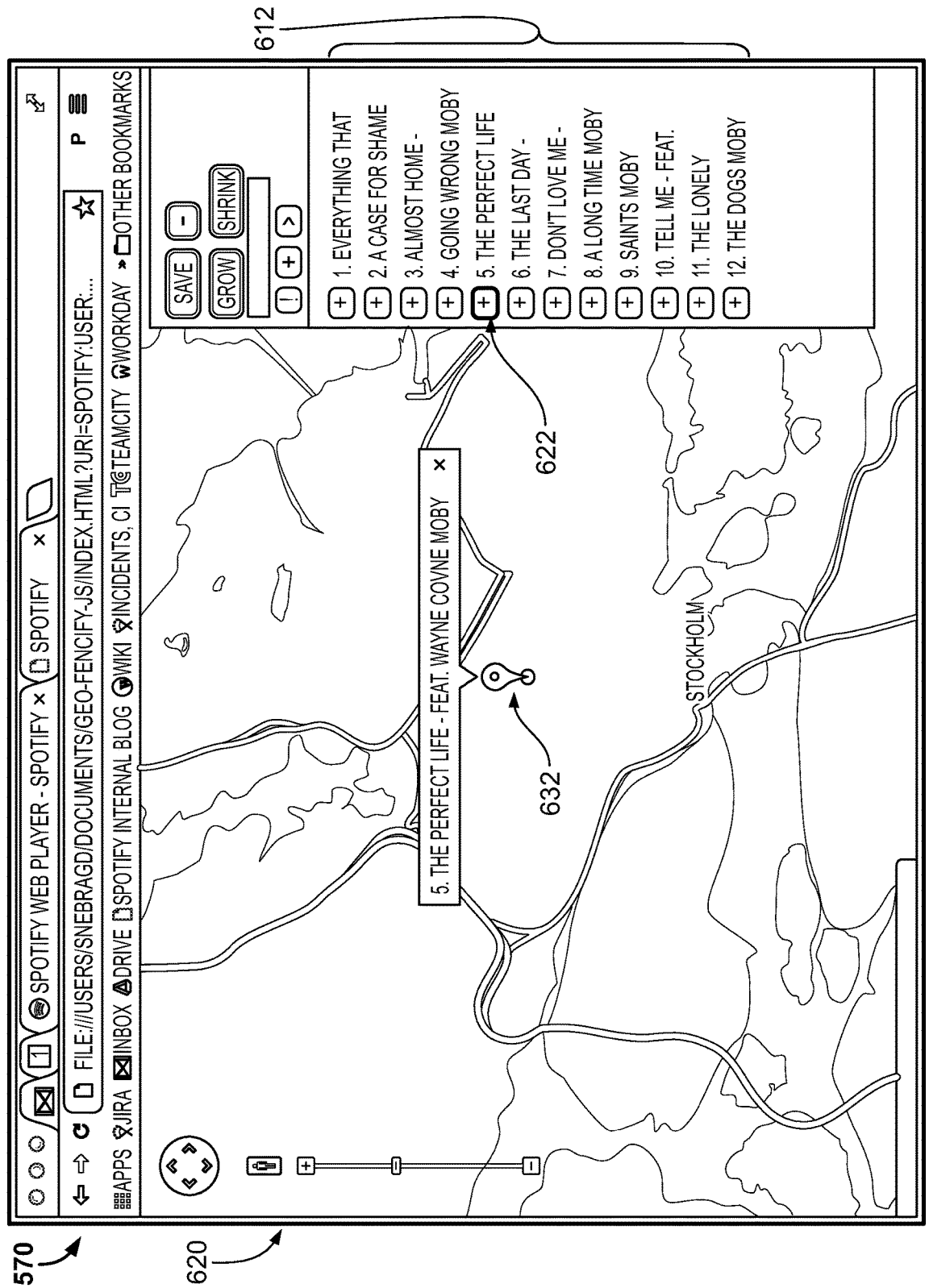
FIG. 18 is another illustration of the web-based interface shown in FIG. 12.

FIG. 18 is another illustration of the web-based interface 570. In FIG. 18, a location tag 632 has been added to the map 620 to indicate a location associated with the fifth media content item in the list 612. In some embodiments, the location tag 632 can be dragged to a different location on the map 620.

Figure 19:
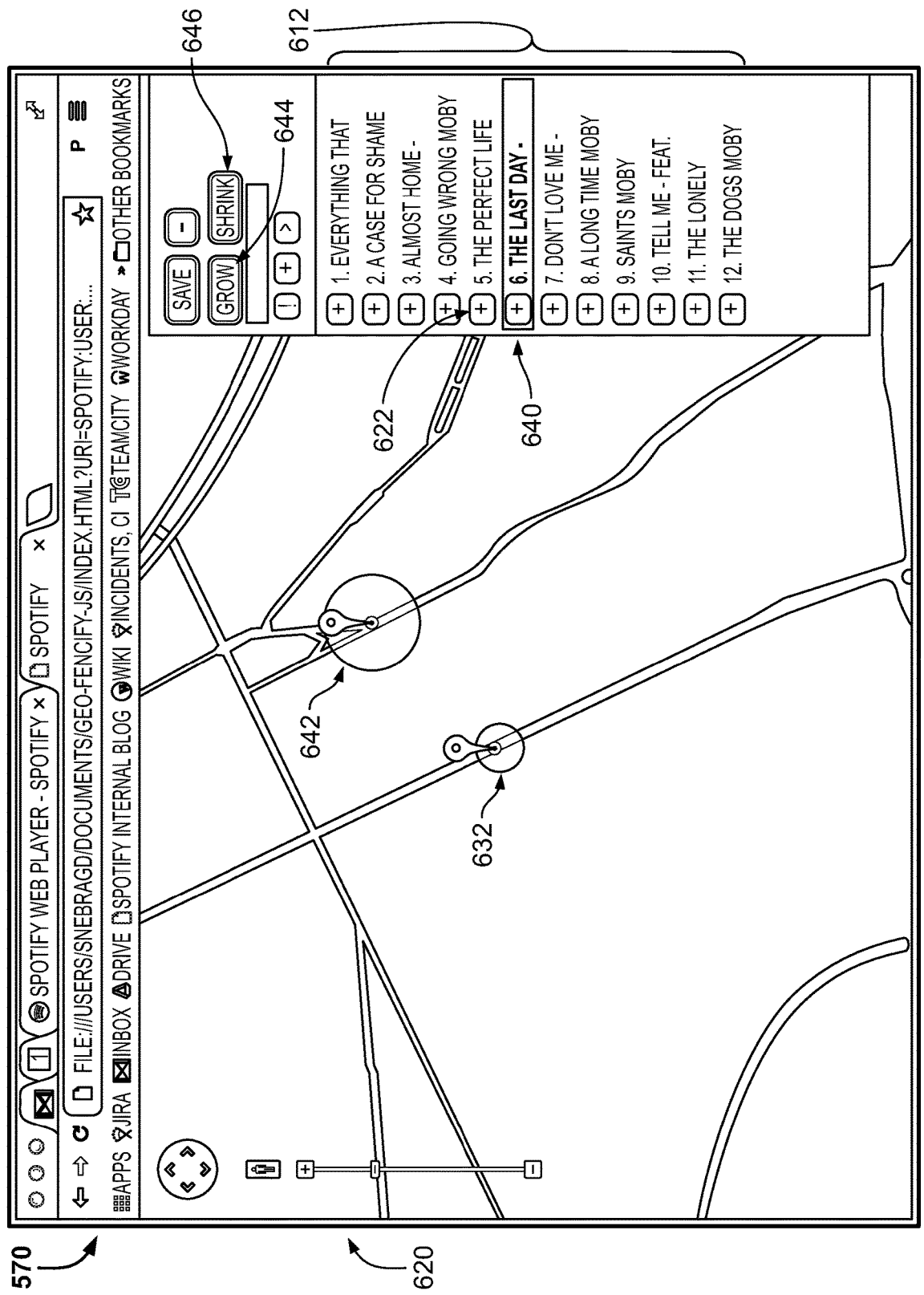
FIG. 19 is another illustration of the web-based interface shown in FIG. 12.

FIG. 19 is another illustration of the web-based interface 570. In FIG. 19, another location tag 642 has been added to the map 620 to indicate a location associated with the sixth media content item in the list 612 using the actuatable element 640. Also shown are an actuatable element 644 and an actuatable element 646, that are usable to grow and shrink a location tag.

Figure 20:
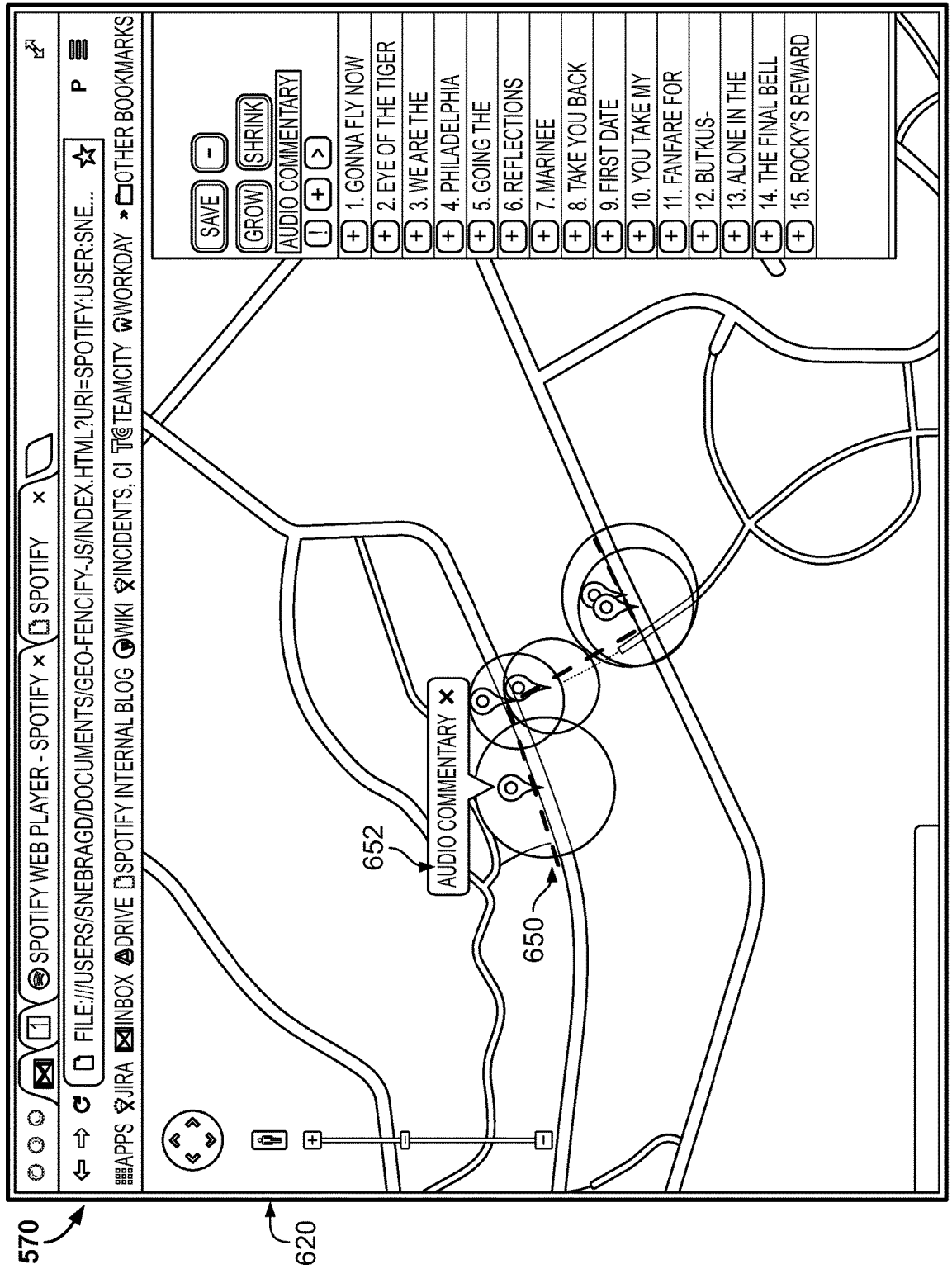
FIG. 20 is another illustration of the web-based interface shown in FIG. 12.

FIG. 20 is another illustration of the web-based interface 570. In FIG. 20, a route 650 is shown on the map 620. As can be seen in FIG. 20, the route include five location tags arranged in order along a route, including location tag 652, which is associated with a voiceover media content item.

Figure 21:
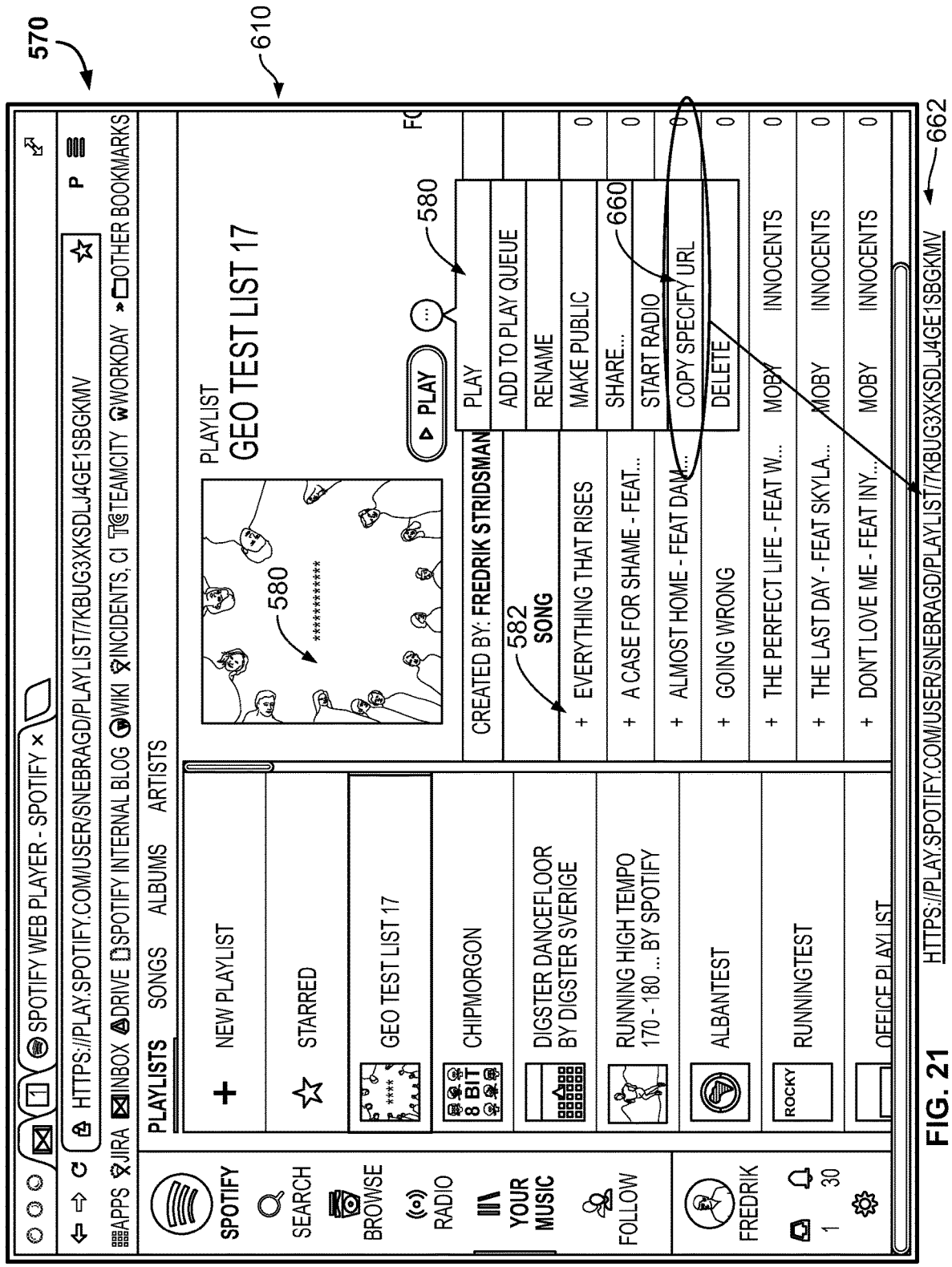
FIG. 21 is another illustration of the web-based interface shown in FIG. 12.

FIG. 21 is another illustration of the web-based interface 570. In FIG. 21, the web-based interface 570 displays the menu 580 that includes actuatable element 660, labeled "Copy Spotify URL." In some embodiments, when a user input actuating the actuatable element 660 is received, text 662 representing the uniform resource locator (URL) of the location-based media playlist is made available to the user U, such as by placing the text in a copy buffer. This text 662 can be shared with others as a means of sharing and providing access to the location-based media playlist.

In other embodiments, other methods of sharing location-based media playlists are available as well. For example, a location-based media playlist may be shared via a Quick Response (QR) code image that represents the URL of the playlist. The QR code may be placed in a visible location near the start of a route associated with the location-based media playlist. As another example, location-based media playlists may be shared publicly and can be accessed by any user in the region surrounding the route, such as through a search for nearby location-based media playlists function provided by some embodiments of the media-playback device 102.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A media-playback device comprising:
  a location-determining device that determines a geographical location of the media-playback device;
  a media-output device that plays media content items;
  at least one processing device; and
  at least one computer readable data storage device storing instructions that, when executed by the at least one processing device, cause the media-playback device to:
    receive a selection of a location-based media playlist, wherein the location-based media playlist comprises playlist data that identify a set of media content items and define a route having an order of geographic locations, each geographic location in the route being associated with a media content item from the set of media content items;
    determine a first geographic location of the media-playback device using the location-determining device;
    identify a media content item of the location-based playlist based on the determined first geographic location and the route;
    play the media content item; and
    direct a user of the media-playback device to a target geographic location identified in the route by causing the media-playback device to further:
      determine a second geographic location of the media-playback device using the location-determining device; and
      adjust at least one of a tempo and a volume of the media content item based on a comparison of the first and second geographic locations relative to the target location to indicate whether the media-playback device is closer or farther away from the target geographic location identified in the route.

2. The media-playback device of claim 1, wherein the playlist data further includes at least one route-based rule based at least in part on at least one of: a movement direction, a velocity, an order, and an activity type.

3. The media-playback device of claim 2, wherein identify the media content item is further based on whether the at least one route-based rule is satisfied.

4. The media-playback device of claim 1, wherein the media content item is a voice-over audio file.

5. The media-playback device of claim 4, wherein the voice-over audio file is a user generated audio file recorded using the media-playback device.

6. The media-playback device of claim 1, further comprising a network communication device that communicates with a media server, and wherein the instructions further cause the media-playback device to:
receive the location-based media playlist from the media server using the network communication device.

7. The media-playback device of claim 1, wherein the instructions further cause the media-playback device to:
receive a tag input;
in response to receiving the tag input, determine a third geographic location of the media-playback device using the location-determining device; and
transmit a location tag to a media server, wherein the location tag includes the third geographic location of the media-playback device and is usable by the media server to associate a new media content item with the third geographic location.

8. The media-playback device of claim 1, wherein the instructions further cause the media-playback device to:
receive a first tag input;
in response to receiving the first tag input, determine a third geographic location of the media-playback device using the location-determining device;
transmit a first location tag to a media server, wherein the first location tag includes the third geographic location and is usable by the media server to associate a first new media content item with the third geographic location;
receive a second tag input;
in response to receiving the second tag input, determine a fourth geographic location of the media-playback device using the location-determining device;
transmit a second location tag to the media server, wherein the second location tag includes the fourth geographic location and is usable by the media server to associate a second new media content item with the fourth geographic location; and
define the route to include the third and fourth geographic locations.

9. The media-playback device of claim 1, wherein the instructions further cause the media-playback device to:
receive a voice-over tag input;
in response to receiving the voice-over tag input:
determine a third geographic location of the media-playback device using the location-determining device; and
record an audio file using an audio recording device; and
transmit a location tag and the audio file to a media server, wherein the location tag includes the third geographic location and is usable by the media server to associate the audio file with the third geographic location.

10. The media-playback device of claim 1, wherein the playlist data defining a route include trajectory data.

11. The media-playback device of claim 10, wherein the trajectory data include at least one of a velocity value, and a direction of travel value.

12. The media-playback device of claim 10, wherein the instructions further cause the media-playback device to:
determine trajectory information for the media-playback device based on location data from the location-determining device; and
wherein the media content item in the location-based playlist is identified based on the determined geographic location and the determined trajectory information.

13. The media-playback device of claim 12, wherein determine the trajectory information comprises calculating a change in the location of the media-playback device.

14. The media-playback device of claim 1, wherein each geographic location in the route includes location data identifying the geographic location and a region surrounding the geographic location, the region surrounding the geographic location defining a threshold for playing the media content item.

15. The media-playback device of claim 1, wherein the target geographic location is selected from the geographic locations in the route associated with the media content items in the location-based media playlist.

16. The media-playback device of claim 1, wherein the target geographic location is selected as a nearest geographic location associated with a media content item in the location-based media playlist that has not been visited.

17. The media-playback device of claim 1, wherein the target geographic location is selected based on a user input identifying a location-tagged media content item or a geographic location not currently associated with a media content item in the location-based media playlist.

18. A media server comprising:
a media data store encoded on at least one computer readable data storage device, the data store comprising:
a plurality of media content items;
location data identifying geographical locations; and
at least one location-based playlist comprising playlist data, wherein the playlist data identifies a subset of the media content items of the plurality of media content items and defines a route having an order of geographic locations, each geographic location in the route being associated with a media content item from the set of media content items; and
a computing device in data communication with the media data store, wherein the computing device is programmed to:
identify a media content item of a location-based playlist based on a first geographic location of a media-playback device;
transmit the media content item to the media-playback device; and
adjust at least one of a tempo and a volume of the media content item based on a difference between the first geographic location and a second geographic location of the media-playback device relative to a target location in the route associated with another media content item in the location-based playlist.

19. The media server of claim 18, wherein the computing device in data communication with the media data store is further programmed to:
receive a location tag; and
in response to receiving the location tag, associate a new media content item with a third geographic location.

20. The media server of claim 18, wherein the computing device in data communication with the media data store is further programmed to:
receive a voice-over tag and a voice-over audio file;
in response to receiving the voice-over tag and voice-over audio file, store the voice-over audio file in the data store and associate the voice-over audio file with a geographic location.

21. A method of media item playback on a media-playback device, the method comprising:
displaying at least one location-based media playlist on the media-playback device,
wherein the at least one location-based media playlist comprises playlist data that identifies a set of media content items and defines a route having an order of geographic locations, each geographic location in the route being associated with a media content item from the set of media content items, and wherein the playlist data defines at least one route-based rule;

determining a first geographic location of the media-playback device;

identifying a media content item of the at least one location-based media playlist based on the first geographic location and the at least one route-based rule being satisfied;

playing the media content item; and adjusting at least one of a tempo and a volume of the media content item based on a difference between the first geographic location and a second geographic location of the media-playback device relative to a target location in the route associated with another media content item in the at least one location-based media playlist.

22. The method of claim 21, further comprising:

receiving a streaming of the media content item from a media server.

* * * * *